(12) United States Patent
Brandner et al.

(10) Patent No.: US 7,902,096 B2
(45) Date of Patent: Mar. 8, 2011

(54) MONOCOMPONENT MONOLAYER MELTBLOWN WEB AND MELTBLOWING APPARATUS

(75) Inventors: John M. Brandner, St. Paul, MN (US); William J. Kopecky, Hudson, WI (US); Seyed A. Angadjivand, Woodbury, MN (US); James E. Springett, Hudson, WI (US); Timothy J. Lindquist, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 74 days.

(21) Appl. No.: 11/461,136

(22) Filed: Jul. 31, 2006

(65) Prior Publication Data

US 2008/0026659 A1 Jan. 31, 2008

(51) Int. Cl.
*D04H 1/56* (2006.01)
*D04H 3/00* (2006.01)
*D04H 3/16* (2006.01)

(52) U.S. Cl. ......... 442/400; 442/334; 442/340; 442/344; 442/401

(58) Field of Classification Search .............. 442/334, 442/340, 344, 400, 401; 128/205.29–206.24; 428/36.1, 221, 373
See application file for complete search history.

(56) References Cited

U.S. PATENT DOCUMENTS

| | | | |
|---|---|---|---|
| 3,073,735 A | 1/1963 | Till | |
| 3,981,650 A | 9/1976 | Page | |
| 4,100,324 A | 7/1978 | Anderson et al. | |
| 4,118,531 A | 10/1978 | Hauser | |
| 4,405,297 A | 9/1983 | Appel et al. | |
| 4,536,361 A | 8/1985 | Torobin | |
| 4,536,440 A | 8/1985 | Berg | |
| 4,547,420 A | 10/1985 | Krueger et al. | |
| 4,588,537 A | 5/1986 | Klasse et al. | |
| 4,714,647 A * | 12/1987 | Shipp et al. ............ | 428/212 |
| 4,931,355 A | 6/1990 | Radwanski et al. | |
| 4,988,560 A | 1/1991 | Meyer et al. | |
| 5,079,080 A | 1/1992 | Schwarz | |
| 5,227,107 A | 7/1993 | Dickenson et al. | |

(Continued)

FOREIGN PATENT DOCUMENTS

CA  2647800  10/2007

(Continued)

OTHER PUBLICATIONS

Textile Glossary, Copyright 2001, Celanese Acetate LLC, p. 98.*

(Continued)

*Primary Examiner* — Angela Ortiz
*Assistant Examiner* — Jennifer Steele
(74) *Attorney, Agent, or Firm* — Kenneth B. Wood

(57) ABSTRACT

A porous monocomponent nonwoven web contains a bimodal mass fraction/fiber size mixture of intermingled continuous microfibers and larger size fibers of the same polymeric composition. There are at least five times as many microfibers as larger size fibers, and a histogram of the mass fraction of fibers vs. fiber size exhibits a larger size fiber mode greater than 10 μm. The web may be made by flowing fiber-forming material through a die cavity having larger size orifices and at least five times as many smaller size orifices to form filaments, attenuating the filaments into fibers and collecting the attenuated fibers to form the nonwoven web. The web is especially well suited to the manufacture of self-supporting three dimensional articles such as molded cup-shaped respirators and pleated air filters.

14 Claims, 10 Drawing Sheets

U.S. PATENT DOCUMENTS

| | | | |
|---|---|---|---|
| 5,374,458 | A | 12/1994 | Burgio |
| 5,382,400 | A | 1/1995 | Pike et al. |
| 5,480,466 | A * | 1/1996 | Jackson et al. ............. 55/528 |
| 5,496,507 | A | 3/1996 | Angadjivand et al. |
| 5,582,907 | A | 12/1996 | Pall |
| 5,591,335 | A * | 1/1997 | Barboza et al. ............ 210/323.2 |
| 5,641,555 | A | 6/1997 | Berrigan et al. |
| 5,679,042 | A | 10/1997 | Varona |
| 5,679,379 | A | 10/1997 | Fabbricante et al. |
| 5,681,469 | A | 10/1997 | Barboza et al. |
| 5,685,757 | A | 11/1997 | Kirsch et al. |
| 5,695,376 | A | 12/1997 | Datta et al. |
| 5,707,468 | A | 1/1998 | Arnold et al. |
| 5,721,180 | A | 2/1998 | Pike et al. |
| 5,817,584 | A | 10/1998 | Singer et al. |
| 5,873,968 | A * | 2/1999 | Pike et al. ............. 156/73.2 |
| 5,877,098 | A | 3/1999 | Tanaka et al. |
| 5,902,540 | A | 5/1999 | Kwok |
| 5,904,298 | A | 5/1999 | Kwok et al. |
| 5,908,598 | A | 6/1999 | Rousseau et al. |
| 5,993,543 | A | 11/1999 | Aoki et al. |
| 5,993,943 | A | 11/1999 | Bodaghi et al. |
| 6,041,782 | A | 3/2000 | Angadjivand et al. |
| 6,176,955 | B1 | 1/2001 | Haynes et al. |
| 6,183,670 | B1 | 2/2001 | Torobin et al. |
| 6,230,901 | B1 | 5/2001 | Ogata et al. |
| 6,269,513 | B1 | 8/2001 | Torobin |
| 6,274,238 | B1 | 8/2001 | DeLucia |
| 6,315,806 | B1 * | 11/2001 | Torobin et al. ............. 55/522 |
| 6,319,865 | B1 | 11/2001 | Mikami |
| 6,397,458 | B1 | 6/2002 | Jones et al. |
| 6,398,847 | B1 | 6/2002 | Jones et al. |
| 6,409,806 | B1 | 6/2002 | Jones et al. |
| 6,562,112 | B2 | 5/2003 | Jones et al. |
| 6,607,624 | B2 | 8/2003 | Berrigan et al. |
| 6,667,254 | B1 | 12/2003 | Thompson et al. |
| 6,723,669 | B1 | 4/2004 | Clark et al. |
| 6,827,764 | B2 | 12/2004 | Springett et al. |
| 6,858,297 | B1 | 2/2005 | Shah et al. |
| 6,916,752 | B2 | 7/2005 | Berrigan et al. |
| 6,923,182 | B2 | 8/2005 | Angadjivand et al. |
| 6,998,164 | B2 | 2/2006 | Neely et al. |
| 2001/0003082 | A1 * | 6/2001 | kahlbaugh et al. ............ 442/340 |
| 2003/0134515 | A1 | 7/2003 | David et al. |
| 2003/0162457 | A1 | 8/2003 | Berrigan et al. |
| 2004/0097155 | A1 | 5/2004 | Olson et al. |
| 2005/0176326 | A1 | 8/2005 | Bond |
| 2005/0217226 | A1 | 10/2005 | Sundet et al. |
| 2006/0151905 | A1 | 7/2006 | Bornmann |
| 2008/0022643 | A1 | 1/2008 | Fox et al. |
| 2008/0026173 | A1 | 1/2008 | Angadjivand et al. |
| 2008/0026661 | A1 | 1/2008 | Fox et al. |
| 2008/0315454 | A1 | 12/2008 | Angadjivand et al. |
| 2008/0318014 | A1 | 12/2008 | Angadjivand et al. |
| 2008/0318024 | A1 | 12/2008 | Angadjivand et al. |
| 2009/0315224 | A1 | 12/2009 | Angadjivand et al. |

FOREIGN PATENT DOCUMENTS

| | | |
|---|---|---|
| EP | 0 322 136 B1 | 2/1994 |
| EP | 0799342 | 9/1999 |
| EP | 1 424 412 A1 | 6/2004 |
| JP | 2001/040566 A | 2/2001 |
| JP | 2001-049560 | 2/2001 |
| JP | 2002-348737 | 4/2002 |
| JP | 2002-180331 | 6/2002 |
| JP | 2007054778 | 3/2007 |
| WO | WO 99/23285 A1 | 5/1999 |
| WO | WO 00/15891 A1 | 3/2000 |
| WO | WO 00/48478 A1 | 8/2000 |
| WO | WO 02/46504 | 6/2002 |
| WO | WO 2007/112877 | 10/2007 |

OTHER PUBLICATIONS

Dahiya, et al; "Melt Blown Technology," [retrieved from the Internet May 2009]; URL <http://www.engr.utk.edu/mse/pages/Textiles/Melt%20Blown%20Technology.htm>; pp. 1-8.

Q & A Regarding Melt-Blow; Shinwa Industrial Co., Ltd.; [retrieved from the Internet May 2009]; URL <http://www.shinwa-cc.co.jp/en/inquiry/faq2.html#cs1>; pp. 1-3.

Supplementary European Search Report, PCT/US2007/073772, Oct. 20, 2010, 3 pages.

International Search Report, PCT/2007/073772, Dec. 22, 2007, 3 pages.

* cited by examiner

MONOCOMPONENT MONOLAYER MELTBLOWN WEB AND MELTBLOWING APPARATUS

FIELD OF THE INVENTION

This invention relates to meltblown webs and meltblowing equipment.

BACKGROUND

Patents or applications relating to nonwoven webs, their manufacture and articles made therefrom include U.S. Pat. No. 3,981,650 (Page), U.S. Pat. No. 4,100,324 (Anderson), U.S. Pat. No. 4,118,531 (Hauser), U.S. Pat. No. 4,536,440 (Berg), U.S. Pat. No. 4,547,420 (Krueger et al.), U.S. Pat. No. 4,931,355 (Radwanski et al.), U.S. Pat. No. 4,988,560 (Meyer et al.), U.S. Pat. No. 5,227,107 (Dickenson et al.), U.S. Pat. No. 5,374,458 (Burgio) U.S. Pat. No. 5,382,400 (Pike et al. '400), U.S. Pat. No. 5,679,042 (Varona), U.S. Pat. No. 5,679,379 (Fabbricante et al.), U.S. Pat. No. 5,695,376 (Datta et al.), U.S. Pat. No. 5,707,468 (Arnold et al.), U.S. Pat. No. 5,721,180 (Pike et al. '180), U.S. Pat. No. 5,817,584 (Singer et al.), U.S. Pat. No. 5,877,098 (Tanaka et al.), U.S. Pat. No. 5,902,540 (Kwok), U.S. Pat. No. 5,904,298 (Kwok et al.), U.S. Pat. No. 5,993,543 (Bodaghi et al.), U.S. Pat. No. 6,176,955 B1 (Haynes et al.), U.S. Pat. No. 6,183,670 B1 (Torobin et al.), U.S. Pat. No. 6,230,901 B1 (Ogata et al.), U.S. Pat. No. 6,319,865 B1 (Mikami), U.S. Pat. No. 6,607,624 B2 (Berrigan et al. '624), U.S. Pat. No. 6,667,254 B1 (Thompson et al.), U.S. Pat. No. 6,723,669 (Clark et al.), U.S. Pat. No. 6,827,764 B2 (Springett et al.), U.S. Pat. No. 6,858,297 B1 (Shah et al.), U.S. Pat. No. 6,916,752 B2 (Berrigan et al. '752) and U.S. Pat. No. 6,998,164 B2 (Neely et al.); European Patent No. EP 0 322 136 B1 (Minnesota Mining and Manufacturing Co.); Japanese published application Nos. JP 2001-049560 (Nissan Motor Co. Ltd.), JP 2002-180331 (Chisso Corp. '331) and JP 2002-348737 (Chisso Corp. '737); and U.S. Patent Application Publication Nos. US2004/0097155 A1 (Olson et al.) and US2005/0217226 A1 (Sundet et al. '226).

SUMMARY OF THE INVENTION

Shaped filtration articles such as molded respirators or pleated furnace filters are sometimes made using nonwoven webs made from multicomponent (e.g., bicomponent) fibers. FIG. 1a through FIG. 1e depict five popular bicomponent fiber configurations, which may be referred to respectively as "2-layer" or "side-by-side" (FIG. 1a), "islands in the sea" (FIG. 1b), "solid segmented pie" (FIG. 1c), "hollow segmented pie" (FIG. 1d) and "sheath-core" (FIG. 1e). The use of two polymers in such fibers limits the extent to which unused portions of the bicomponent fiber web may be recycled, and if only one polymer is electret chargeable may limit the extent to which charge may be placed on the web. Shaped filtration articles may also be formed by adding an extraneous bonding material (e.g., an adhesive) to a filtration web, with consequent limitations due to the chemical or physical nature of the added bonding material including added web basis weight and loss of recyclability. Existing methods for manufacturing shaped filtration articles such as molded respirators or pleated furnace filters generally involve some compromise of web or article properties and one or more of the disadvantages mentioned above.

The above-mentioned U.S. Pat. No. 3,981,650 (Page) describes a meltblowing die equipped with two die cavities each fed a different polymer from a separate extruder. The use of two extruders adds cost and complexity, and the use of two polymers can provide the other disadvantages mentioned above.

The above-mentioned U.S. Pat. No. 6,319,865 B1 (Mikami) does not discuss shaped filtration articles, but does discuss liquid filtration webs made using a meltblowing die in which a single polymer is fed to a row of 2 to 4 smaller nozzles set between a larger nozzle on each side of the row of smaller nozzles. Mikami says that the nozzle diameters should stand in a ratio from 1.3 to 2.0. Mikami also includes a comparative example in which 5 nozzles are set between a larger nozzle on each side of the row of smaller nozzles, and says that a nonwoven fabric made using such a nozzle arrangement or made using only one smaller nozzle disposed between adjacent larger nozzles will have a narrower fiber distribution and shorter service life.

We have now found monocomponent nonwoven webs which may be made using a single extruder and single meltblowing die and molded or otherwise formed into three-dimensional shapes to provide high performance shaped filtration articles having very good stiffness after molding and very good filtration capability in their molded or shaped state. The invention provides in one aspect a porous monocomponent nonwoven web containing a meltblown bimodal mass fraction/fiber size mixture of intermingled continuous microfibers and larger size fibers of the same polymeric composition, wherein there are at least five times as many microfibers as larger size fibers and wherein a histogram of the mass fraction of fibers vs. fiber size exhibits a larger size fiber mode greater than 10 µm.

The invention provides in another aspect a process for forming a monocomponent nonwoven web comprising flowing fiber-forming material through a die cavity having larger size orifices and at least five times as many smaller size orifices to form filaments, using air or other fluid to attenuate the filaments into fibers and collecting the attenuated fibers as a nonwoven web containing a meltblown bimodal mass fraction/fiber size mixture of intermingled continuous microfibers and larger size fibers of the same polymeric composition, wherein there are at least five times as many microfibers as larger size fibers and wherein a histogram of the mass fraction of fibers vs. fiber size exhibits a larger size fiber mode greater than 10 µm.

The disclosed nonwoven webs have a number of beneficial and unique properties. Both the larger size fibers and the microfibers may be highly charged. The larger size fibers can impart improved moldability and improved stiffness to the molded or shaped matrix. The microfibers can impart increased fiber surface area to the web, with beneficial effects such as improved filtration performance. By using microfibers and larger size fibers of different sizes, filtration and molding properties can be tailored to a particular use. And in contrast to the high pressure drop (and thus high breathing resistance) often characteristic of microfiber webs, pressure drops of the disclosed nonwoven webs are kept lower, because the larger fibers physically separate and space apart the microfibers. The microfibers and larger size fibers also appear to cooperate with one another to provide a higher particle depth loading capacity. The disclosed webs have additional uses aside from filtration.

By using direct-web-formation manufacturing equipment, in which a fiber-forming polymeric material is converted into a web in one essentially direct operation, and by using a single extruder and a single polymeric resin, the disclosed nonwoven webs can be quite economically prepared. Also, if the microfibers and larger size fibers all have the same polymeric composition and extraneous bonding materials are not employed, unused portions of the disclosed nonwoven webs can be fully recycled.

These and other aspects of the invention will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWING

Like reference symbols in the various figures of the drawing indicate like elements. The elements in the drawing are not to scale.

DETAILED DESCRIPTION

Figure 1A:
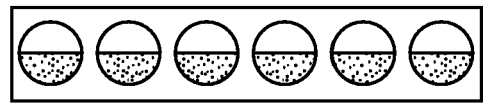
FIG. 1a through FIG. 1e respectively show cross-sectional schematic views of several bicomponent fiber configurations.
Figure 1B:
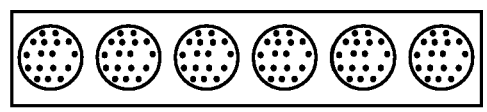
Figure 1C:
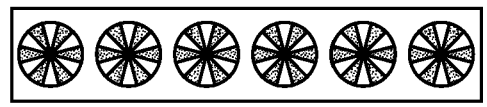
Figure 1D:
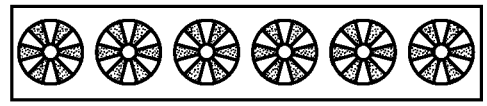
Figure 1E:
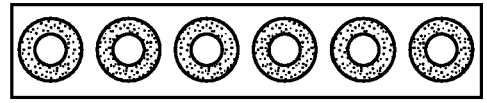

The term "porous" means air-permeable.

The term "monocomponent" when used with respect to a fiber or collection of fibers means fibers having essentially the same composition across their cross-section; monocomponent includes blends (viz., polymer alloys) or additive-containing materials, in which a continuous phase of uniform composition extends across the cross-section and over the length of the fiber.

The term "of the same polymeric composition" means polymers that have essentially the same repeating molecular unit, but which may differ in molecular weight, melt index, method of manufacture, commercial form, etc.

The term "size" when used with respect to a fiber means the fiber diameter for a fiber having a circular cross section, or the length of the longest cross-sectional chord that may be constructed across a fiber having a non-circular cross-section.

The term "continuous" when used with respect to a fiber or collection of fibers means fibers having an essentially infinite aspect ratio (viz., a ratio of length to size of e.g., at least about 10,000 or more).

The term "Effective Fiber Diameter" when used with respect to a collection of fibers means the value determined according to the method set forth in Davies, C. N., "The Separation of Airborne Dust and Particles", Institution of Mechanical Engineers, London, Proceedings 1B, 1952 for a web of fibers of any cross-sectional shape be it circular or non-circular.

The term "mode" when used with respect to a histogram of mass fraction vs. fiber size in μm or a histogram of fiber count (frequency) vs. fiber size in μm means a local peak whose height is larger than that for fiber sizes 1 and 2 μm smaller and 1 and 2 μm larger than the local peak.

The term "bimodal mass fraction/fiber size mixture" means a collection of fibers having a histogram of mass fraction vs. fiber size in μm exhibiting at least two modes. A bimodal mass fraction/fiber size mixture may include more than two modes, for example it may be a trimodal or higher-modal mass fraction/fiber size mixture.

The term "bimodal fiber count/fiber size mixture" means a collection of fibers having a histogram of fiber count (frequency) vs. fiber size in μm exhibiting at least two modes whose corresponding fiber sizes differ by at least 50% of the smaller fiber size. A bimodal fiber count/fiber size mixture may include more than two modes, for example it may be a trimodal or higher-modal fiber count/fiber size mixture.

The term "bonding" when used with respect to a fiber or collection of fibers means adhering together firmly; bonded fibers generally do not separate when a web is subjected to normal handling.

The term "nonwoven web" means a fibrous web characterized by entanglement or point bonding of the fibers.

The term "monolayer matrix" when used with respect to a nonwoven web containing a bimodal mass fraction/fiber size mixture of fibers means having (other than with respect to fiber size) a generally uniform distribution of similar fibers throughout a cross-section of the web, and having (with respect to fiber size) fibers representing each modal population present throughout a cross-section of the web. Such a monolayer matrix may have a generally uniform distribution of fiber sizes throughout a cross-section of the web or may, for example, have a depth gradient of fiber sizes such as a preponderance of larger size fibers proximate one major face of the web and a preponderance of microfibers proximate the other major face of the web.

The term "attenuating the filaments into fibers" means the conversion of a segment of a filament into a segment of greater length and smaller size.

The term "meltblown" when used with respect to a nonwoven web means a web formed by extruding a fiber-forming material through a plurality of orifices to form filaments while contacting the filaments with air or other attenuating fluid to attenuate the filaments into fibers and thereafter collecting a layer of the attenuated fibers.

The term "meltblown fibers" means fibers prepared by extruding molten fiber-forming material through orifices in a die into a high-velocity gaseous stream, where the extruded material is first attenuated and then solidifies as a mass of fibers. Although meltblown fibers have sometimes been reported to be discontinuous, the fibers generally are long and entangled sufficiently that it is usually not possible to remove one complete meltblown fiber from a mass of such fibers or to trace one meltblown fiber from beginning to end.

The term "meltblowing die" means a die for use in a meltblowing process.

The term "microfibers" means fibers having a median size (as determined using microscopy) of 10 μm or less; "ultrafine microfibers" means microfibers having a median size of two μm or less; and "submicron microfibers" means microfibers having a median size one μm or less. When reference is made herein to a batch, group, array, etc. of a particular kind of microfiber, e.g., "an array of submicron microfibers," it means the complete population of microfibers in that array, or the complete population of a single batch of microfibers, and not only that portion of the array or batch that is of submicron dimensions.

The term "charged" when used with respect to a collection of fibers means fibers that exhibit at least a 50% loss in Quality Factor QF (discussed below) after being exposed to a 20 Gray absorbed dose of 1 mm beryllium-filtered 80 KVp X-rays when evaluated for percent dioctyl phthalate (% DOP) penetration at a face velocity of 7 cm/sec.

The term "self-supporting" means a web having sufficient coherency and strength so as to be handleable by itself using reel-to-reel manufacturing equipment without substantial tearing or rupture.

The term "King Stiffness" means the force required using a King Stiffness Tester from J. A. King & Co., Greensboro, N.C. to push a flat-faced, 2.54 cm diameter by 8.1 m long probe against a molded cup-shaped respirator prepared by forming a test cup-shaped matrix between mating male and female halves of a hemispherical mold having a 55 mm radius and a 310 cm$^3$ volume. The molded matrices are placed under the tester probe for evaluation after first being allowed to cool.

The disclosed monocomponent monolayer web contains a bimodal mass fraction/fiber size mixture of microfibers and larger size fibers. The microfibers may for example have a size range of about 0.1 to about 10 μm, about 0.1 to about 5 μm or about 0.1 to about 1 μm. The larger size fibers ma for example have a size range of about 10 to about 70 μm, about 10 to about 50 μm or about 15 to about 50 μm. A histogram of mass fraction vs. fiber size in μm may for example have a microfiber mode of about 0.1 to about 10 μm, about 0.5 to about 8 μm or about 1 to about 5 μm, and a larger size fiber mode of about 10 to about 50 μm, about 10 to about 40 μm or about 12 to about 30 μm. The disclosed web may also have a bimodal fiber count/fiber size mixture whose histogram of fiber count (frequency) vs. fiber size in μm exhibits at least two modes whose corresponding fiber sizes differ by at least 50%, at least 100%, or at least 200% of the smaller fiber size. The microfibers may also for example provide at least 20% of the fibrous surface area of the web, at least 40% or at least 60%. The web may have a variety of Effective Fiber Diameter (EFD) values, for example an EFD of about 5 to about 40 μm, or of about 6 to about 35 μm. The web may also have a variety of basis weights, for example a basis weight of about 60 to about 300 grams/m$^2$ or about 80 to about 250 grams/m$^2$. When flat (viz., unmolded), the web may have a variety of Gurley Stiffness values, for example a Gurley Stiffness of at least about 100 mg, at least about 200 mg, at least about 300 mg, at least about 500 mg, at least about 1000 mg or at least about 2000 mg.

For use as a molded respirator the disclosed molded matrix preferably has a King Stiffness greater than 1 N and more preferably at least about 2 N or more. As a rough approximation, if a hemispherical molded matrix sample is allowed to cool, placed cup-side down on a rigid surface, depressed vertically (viz., dented) using an index finger and then the pressure released, a matrix with insufficient King Stiffness may tend to remain dented and a matrix with adequate King Stiffness may tend to spring back to its original hemispherical configuration. Some of the molded matrices shown below in the working examples were also or instead evaluated by measuring Deformation Resistance (DR), using a Model TA-XT2i/5 Texture Analyzer (from Texture Technologies Corp.) equipped with a 25.4 mm diameter polycarbonate test probe. The molded matrix is placed facial side down on the Texture Analyzer stage. Deformation Resistance DR is measured by advancing the polycarbonate probe downward at 10 mm/sec against the center of the molded test matrix over a distance of 25 mm. Using five molded test matrix samples, the maximum (peak) force is recorded and averaged to establish Deformation Resistance DR. Deformation Resistance DR preferably is at least about 75 g and more preferably at least about 200 g. We are not aware of a formula for converting King Stiffness values to Deformation Resistance values, but can observe that the Deformation Resistance test may be used to evaluate low stiffness molded matrices that may be below the threshold measurement values in the King Stiffness test. When exposed to a 0.075 μm sodium chloride aerosol flowing at 85 liters/min, the disclosed molded respirator preferably has a pressure drop less than 20 mm H$_2$O and more preferably less than 10 mm H$_2$O. When so evaluated, the molded respirator also preferably has a % NaCl penetration less than about 5%, and more preferably less than about 1%. When evaluated at a 13.8 cm/sec face velocity and using an NaCl challenge, the flat web from which such a molded matrix may be formed preferably has an initial filtration quality factor QF of at least about 0.4 mm$^{-1}$H$_2$O and more preferably at least about 0.5 mm$^{-1}$H$_2$O.

For use as a pleated filter, the disclosed web preferably has a Gurley Stiffness before pleating of at least about 100 mg, and may have a Gurley Stiffness before pleating of at least about 200 mg or at least about 300 mg. When exposed to a 0.185 μm diameter DOP particle aerosol flowing at 85 liters/min at an airborne concentration of about 100 mg/m$^3$, the disclosed pleated filter preferably has an average initial sub-micron efficiency of at least about 15% at a 1.52 meters/sec (300 ft/min) face velocity, and may have an average initial sub-micron efficiency of at least about 25% or at least about 50%. When evaluated at a 13.8 cm/sec face velocity using such a DOP challenge, the flat web from which such a pleated filter may be formed preferably has an initial filtration quality factor QF of at least about 0.3, and more preferably at least about 0.4.

Figure 2:
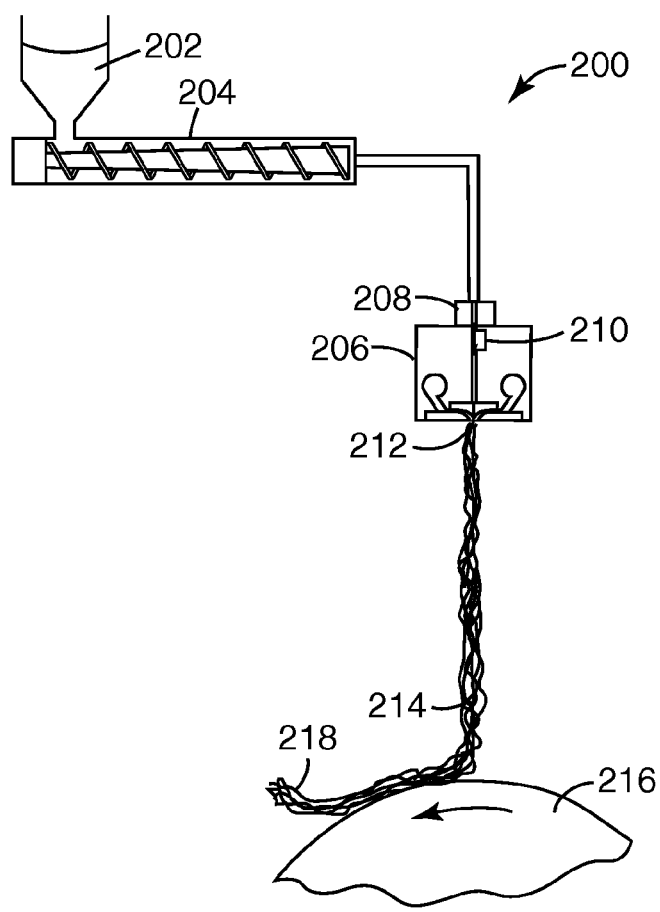
FIG. 2 is a schematic side view of an exemplary process for making a monocomponent nonwoven web containing microfibers and larger size fibers of the same polymeric composition.

FIG. 2 illustrates an apparatus 200 for making a porous monocomponent nonwoven web containing a bimodal fiber count/fiber size mixture of intermingled continuous microfibers and larger size fibers of the same polymeric composition. Liquefied fiber-forming polymeric material fed from hopper 202 and extruder 204 enters meltblowing die 206 via inlet 208, flows through die cavity 210, and exits die cavity 210 through a row (discussed below in connection with FIG. 3) of larger and smaller size orifices arranged in line across the forward end of die cavity 210 and through which the fiber-forming material is extruded as an array of filaments 212. A set of cooperating gas orifices (also discussed below) through which a gas, typically heated air, is forced at very high velocity, attenuate the filaments 212 into fibers 214. The fibers 214 land against porous collector 216 and form a self-supporting nonwoven meltblown web 218.

Figure 3:
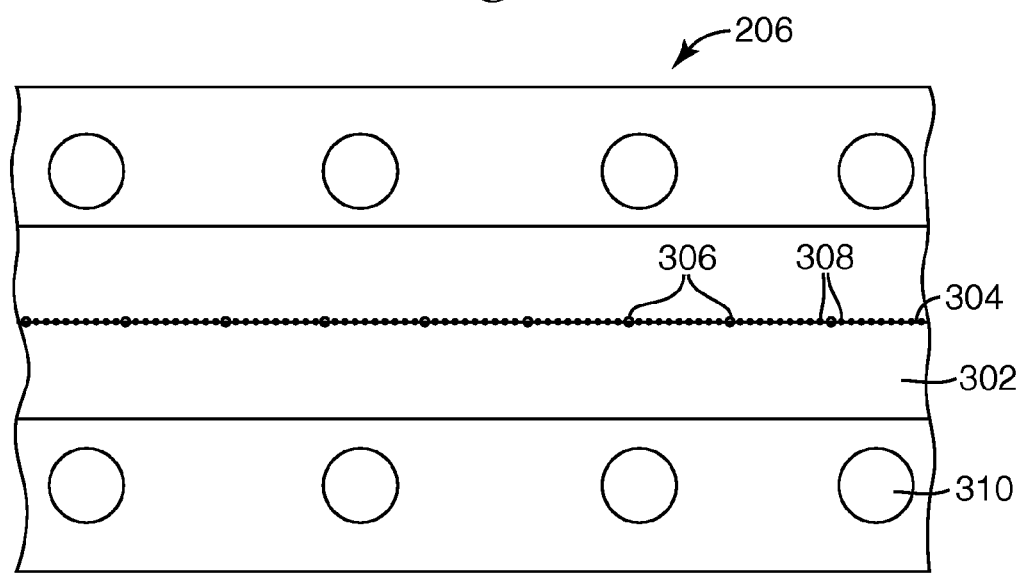
FIG. 3 is an outlet end perspective view of an exemplary meltblowing die having a plurality of larger and smaller orifices.

FIG. 3 shows meltblowing die 206 in outlet end perspective view, with the attenuating gas deflector plates removed. Die 206 includes a projecting tip portion 302 with a row 304 of larger orifices 306 and smaller orifices 308 which define a plurality of flow passages through which liquefied fiber-forming material exits die 206 and forms the filaments 212. Holes 310 receive through-bolts (not shown in FIG. 3) which hold the various parts of the die together. In the embodiment shown in FIG. 3, the larger orifices 306 and smaller orifices 308 have a 2:1 size ratio and there are 9 smaller orifices 308 for each larger orifice 306. Other ratios of larger:smaller orifice sizes may be used, for example ratios of 1.5:1 or more, 2:1 or more, 2.5:1 or more, 3:1 or more, or 3.5:1 or more. Other ratios of the number of smaller orifices per larger orifice may also be used, for example ratios of 5:1 or more, 6:1 or more, 10:1 or more, 12:1 or more, 15:1 or more, 20:1 or more or 30:1 or more. Typically there will be a direct correspondence between the number of smaller orifices per larger orifice and the number of smaller diameter fibers (e.g., microfibers under appropriate operating conditions) per larger size fiber.

As will be appreciated by persons having ordinary skill in the art, appropriate polymer flow rates, die operating temperatures and attenuating airflow rates should be chosen so that larger size fibers are produced from attenuated filaments formed by the larger orifices, microfibers are produced from attenuated filaments formed by the smaller orifices, and the completed web has the desired structure and physical properties. Further details regarding meltblowing may be found in Wente, Van A. "Superfine Thermoplastic Fibers," in Industrial Engineering Chemistry, Vol. 48, pages 1342 et seq. (1956), or in Report No. 4364 of the Naval Research Laboratories, published May 25, 1954, entitled "Manufacture of Superfine Organic Fibers" by Wente, V. A.; Boone, C. D.; and Fluharty, E. L.; in U.S. Pat. No. 5,993,943 (Bodaghi et al.); and in copending U.S. patent application Ser. Nos. 11/461, 307 (now issued as U.S. Pat. No. 7,754,041), filed even date herewith and entitled "PLEATED FILTER WITH BIMODAL MONOLAYER MONOCOMPONENT MEDIA" and 11/461,145 (now allowed), filed even date herewith and entitled "MOLDED MONOCOMPONENT MONOLAYER RESPIRATOR WITH BIMODAL MONOLAYER MONOCOMPONENT MEDIA", the entire disclosures of which are incorporated herein by reference.

The disclosed nonwoven webs may have a random fiber arrangement and generally isotropic in-plane physical properties (e.g., tensile strength). In general such isotropic nonwoven webs are preferred for forming cup-shaped molded respirators. The webs may instead have an aligned fiber construction (e.g., one in which the fibers are aligned in the machine direction as described in the above-mentioned Shah et al. U.S. Pat. No. 6,858,297) and anisotropic in-plane physical properties. If such anisotropic nonwoven webs are employed to form pleated filters, the pleat rows may if desired be aligned with respect to one or more anisotropic properties of interest so as to reduce pleat deformation at high face velocities.

A variety of polymeric fiber-forming materials may be used in the disclosed process. The polymer may be essentially any thermoplastic fiber-forming material capable of providing a nonwoven web. For webs that will be charged the polymer may be essentially any thermoplastic fiber-forming material which will maintain satisfactory electret properties or charge separation. Preferred polymeric fiber-forming materials for chargeable webs are non-conductive resins having a volume resistivity of $10^{14}$ ohm-centimeters or greater at room temperature (22° C.). Preferably, the volume resistivity is about $10^{16}$ ohm-centimeters or greater. Resistivity of the polymeric fiber-forming material may be measured according to standardized test ASTM D 257-93. Polymeric fiber-forming materials for use in chargeable webs also preferably are substantially free from components such as antistatic agents that could significantly increase electrical conductivity or otherwise interfere with the fiber's ability to accept and hold electrostatic charges. Some examples of polymers which may be used in chargeable webs include thermoplastic polymers containing polyolefins such as polyethylene, polypropylene, polybutylene, poly(4-methyl-1-pentene) and cyclic olefin copolymers, and combinations of such polymers. Other polymers which may be used but which may be difficult to charge or which may lose charge rapidly include polycarbonates, block copolymers such as styrene-butadiene-styrene and styrene-isoprene-styrene block copolymers, polyesters such as polyethylene terephthalate, polyamides, polyurethanes, and other polymers that will be familiar to those skilled in the art. The fibers preferably are prepared from poly-4-methyl-1 pentene or polypropylene. Most preferably, the fibers are prepared from polypropylene homopolymer because of its ability to retain electric charge, particularly in moist environments.

Electric charge can be imparted to the disclosed nonwoven webs in a variety of ways. This may be carried out, for example, by contacting the web with water as disclosed in U.S. Pat. No. 5,496,507 to Angadjivand et al., corona-treating as disclosed in U.S. Pat. No. 4,588,537 to Klasse et al., hydrocharging as disclosed, for example, in U.S. Pat. No. 5,908,598 to Rousseau et al., plasma treating as disclosed in U.S. Pat. No. 6,562,112 B2 to Jones et al. and U.S. Patent Application Publication No. US2003/0134515 A1 to David et al., or combinations thereof.

Additives may be added to the polymer to enhance the web's filtration performance, electret charging capability, mechanical properties, aging properties, coloration, surface properties or other characteristics of interest. Representative additives include fillers, nucleating agents (e.g., MILLAD™ 3988 dibenzylidene sorbitol, commercially available from Milliken Chemical), electret charging enhancement additives (e.g., tristearyl melamine, and various light stabilizers such as CHIMASSORB™ 119 and CHIMASSORB 944 from Ciba Specialty Chemicals), cure initiators, stiffening agents (e.g., poly(4-methyl-1-pentene)), surface active agents and surface treatments (e.g., fluorine atom treatments to improve filtration performance in an oily mist environment as described in U.S. Pat. Nos. 6,398,847 B1, 6,397,458 B1, and 6,409,806 B1 to Jones et al.). The types and amounts of such additives will be familiar to those skilled in the art. For example, electret charging enhancement additives are generally present in an amount less than about 5 wt. % and more typically less than about 2 wt. %.

Figure 4:
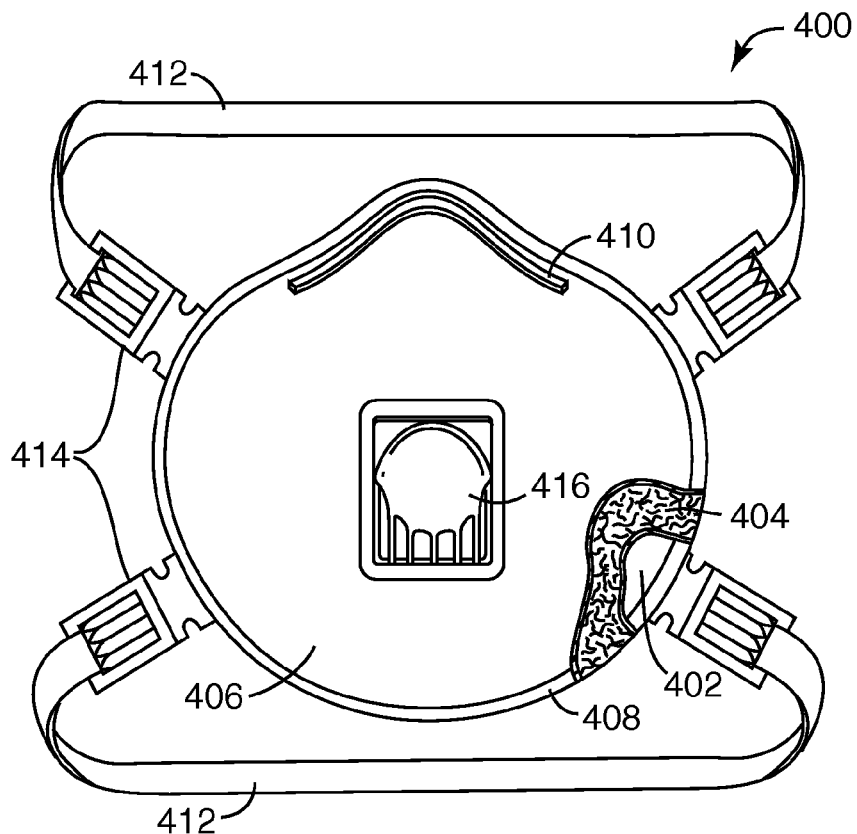
FIG. 4 is a perspective view, partially in section, of a disposable personal respirator having a deformation-resistant cup-shaped porous monolayer matrix disposed between inner and outer cover layers.

FIG. 4 shows in partial cross-section an exemplary cup-shaped disposable personal respirator 400. Respirator 400 includes inner cover web 402, monocomponent filtration layer 404, and outer cover layer 406. Welded edge 408 holds these layers together and provides a face seal region to reduce leakage past the edge of respirator 400. Leakage may be further reduced by pliable dead-soft nose band 410 of for example a metal such as aluminum or a plastic such polypropylene. Respirator 400 also includes adjustable head and neck straps 412 fastened using tabs 414, and exhalation valve 416. Aside from the monocomponent filtration layer 404, further details regarding the construction of respirator 400 will be familiar to those skilled in the art.

Figure 5:
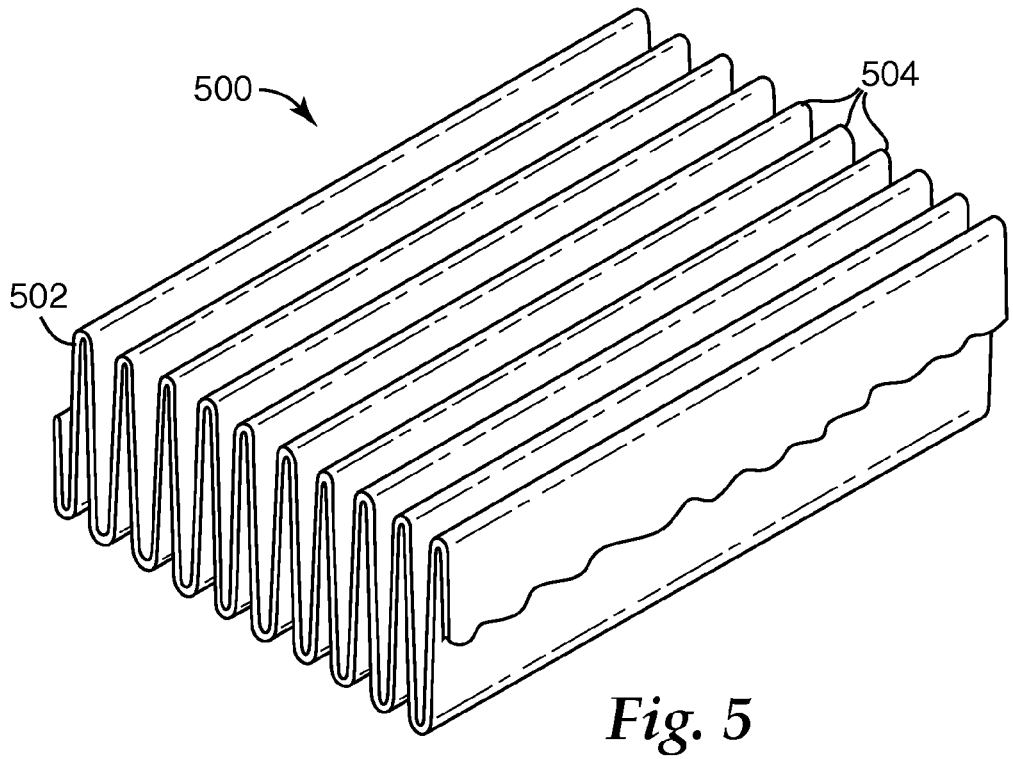
FIG. 5 is a perspective view of pleated filtration media.

FIG. 5 shows in perspective view an exemplary pleated filter 500 made from the disclosed monocomponent filtration layer 502 which has been formed into rows of spaced pleats 504. Persons having ordinary skill in the art will appreciate that filter 500 may be used as is or may be reinforced with a suitable support (e.g., an expanded metal screen) and optionally mounted in a suitable frame (e.g., a metal or cardboard frame) to provide a replaceable filter for use in e.g., HVAC systems. The increased stiffness of pleated filter 500 (arising from the presence of the larger diameter fibers in the disclosed monocomponent filtration layer) is believed to contribute to increased resistance of pleated filter 500 to pleat deformation at high filter face velocities. Aside from the monocomponent filtration layer 502, further details regarding the construction of filter 500 will be familiar to those skilled in the art.

The disclosed nonwoven webs may be formed into these and other finished articles using methods and additional elements that will be familiar to those having ordinary skill in the art. When forming three-dimensional shapes it may be desirable to monitor flat web properties such as basis weight, web thickness, solidity, EFD, Gurley Stiffness, Taber Stiffness, pressure drop, initial % NaCl penetration, % DOP penetration or the Quality Factor QF before shaping, and to monitor shaped (e.g., molded or pleated) matrix properties such as King Stiffness, Deformation Resistance DR, pressure drop or average initial submicron efficiency. For example, molding properties may be evaluated by forming a test cup-shaped matrix between mating male and female halves of a hemispherical mold having a 55 mm radius and a 310 cm$^3$ volume.

EFD may be determined (unless otherwise specified) using an air flow rate of 32 L/min (corresponding to a face velocity of 5.3 cm/sec), using the method set forth in Davies, C. N., "The Separation of Airborne Dust and Particles", Institution of Mechanical Engineers, London, Proceedings 1B, 1952.

Gurley Stiffness may be determined using a Model 4171E GURLEY™ Bending Resistance Tester from Gurley Precision Instruments. Rectangular 3.8 cm×5.1 cm rectangles are die cut from the webs with the sample long side aligned with the web transverse (cross-web) direction. The samples are loaded into the Bending Resistance Tester with the sample long side in the web holding clamp. The samples are flexed in both directions, viz., with the test arm pressed against the first major sample face and then against the second major sample face, and the average of the two measurements is recorded as the stiffness in milligrams. The test is treated as a destructive test and if further measurements are needed fresh samples are employed.

Taber Stiffness may be determined using a Model 150-B TABER™ stiffness tester (commercially available from Taber Industries). Square 3.8 cm×3.8 cm sections are carefully vivisected from the webs using a sharp razor blade to prevent fiber fusion, and evaluated to determine their stiffness in the machine and transverse directions using 3 to 4 samples and a 15° sample deflection.

Percent penetration, pressure drop and the filtration Quality Factor QF may be determined using a challenge aerosol containing NaCl or DOP particles, delivered (unless otherwise indicated) at a flow rate of 85 liters/min, and evaluated using a TSI™ Model 8130 high-speed automated filter tester (commercially available from TSI Inc.). For NaCl testing, the particles may generated from a 2% NaCl solution to provide an aerosol containing particles with a diameter of about 0.075 μm at an airborne concentration of about 16-23 mg/m$^3$, and the Automated Filter Tester may be operated with both the heater and particle neutralizer on. For DOP testing, the aerosol may contain particles with a diameter of about 0.185 μm at a concentration of about 100 mg/m$^3$, and the Automated Filter Tester may be operated with both the heater and particle neutralizer off. The samples may be exposed to the maximum NaCl or DOP particle penetration at a 13.8 cm/sec face velocity for flat web samples or an 85 liters/min flowrate for a molded or shaped matrix before halting the test. Calibrated photometers may be employed at the filter inlet and outlet to measure the particle concentration and the % particle penetration through the filter. An MKS pressure transducer (commercially available from MKS Instruments) may be employed to measure pressure drop (ΔP, mm H$_2$O) through the filter. The equation:

$$QF = \frac{-\ln\left(\frac{\% \text{ Particle Penetration}}{100}\right)}{\Delta P}$$

may be used to calculate QF. Parameters which may be measured or calculated for the chosen challenge aerosol include initial particle penetration, initial pressure drop, initial Quality Factor QF, maximum particle penetration, pressure drop at maximum penetration, and the milligrams of particle loading at maximum penetration (the total weight challenge to the filter up to the time of maximum penetration). The initial Quality Factor QF value usually provides a reliable indicator of overall performance, with higher initial QF values indicating better filtration performance and lower initial QF values indicating reduced filtration performance.

Deformation Resistance DR may be determined using a Model TA-XT2i/5 Texture Analyzer (from Texture Technologies Corp.) equipped with a 25.4 mm diameter polycarbonate test probe. A molded test matrix (prepared as described above in the definition for King Stiffness) is placed facial side down on the Texture Analyzer stage. Deformation Resistance DR is measured by advancing the polycarbonate probe downward at 10 mm/sec against the center of the molded test matrix over a distance of 25 mm. Using five molded test matrix samples, the maximum (peak) force is recorded and averaged to establish the DR value.

Average initial submicron efficiency may be determined by installing the framed filter into a test duct and subjecting the filter to potassium chloride particles which have been dried and charge-neutralized. A test face velocity of 300 ft/min (1.52 meters/sec) may be employed. An optical particle counter may be used to measure the concentration of particles upstream and downstream from the test filter over a series of twelve particle size ranges or channels. The particle size ranges in each channel are taken from ASHRAE standard 52.2 ("Method of Testing General Ventilation Air-Cleaning Devices for Removal Efficiency by Particle Size"). The equation:

$$\text{Capture efficiency}(\%) = \frac{\text{upstream particle count} - \text{downstream particle count}}{\text{upstream particle count}} \times 100$$

may be used to determine capture efficiency for each channel. The capture efficiency values for each of the four submicron channels (viz., particle diameters of 0.3 to 0.4 μm, 0.4 to 0.55 μm, 0.55 to 0.7 μm and 0.7 to 1.0 μm) may be averaged to obtain a single value for "average initial sub-micron efficiency". The test velocity, efficiency and pressure drop results are usually all reported.

The disclosed nonwoven webs may be used for a variety of molded respirator shapes and for a variety of filter configurations, including HVAC (e.g., furnace) filters, vehicle cabin filters, clean room filters, humidifier filters, dehumidifier filters, room air purifier filters, hard disk drive filters and other flat or pleatable supported or self-supporting filtration articles. The disclosed nonwoven webs may if desired include one or more additional layers other than the disclosed monocomponent web. For example, molded respirators may employ inner or outer cover layers for comfort or aesthetic purposes and not for filtration or stiffening. Also, one or more porous layers containing sorbent particles may be employed to capture vapors of interest, such as the porous layers described in U.S. patent application Ser. No. 11/431,152 filed May 8, 2006 and entitled PARTICLE-CONTAINING FIBROUS WEB, the entire disclosure of which is incorporated herein by reference. Other layers (including stiffening layers or stiffening elements) may be included if desired even though not required to provide a shaped monolayer matrix with adequate stiffness or deformation resistance for an intended application. The disclosed nonwoven webs may also be used for applications other than air filtration, e.g., for liquid (e.g., medical) filters, thermal insulation, acoustic insulation, packaging materials, shoe components including uppers, sole components and inserts, and for apparel including outerwear, activewear, and hazardous material garments.

The invention is further illustrated in the following illustrative examples, in which all parts and percentages are by weight unless otherwise indicated.

Example 1

Using an apparatus like that shown in FIG. 2 and FIG. 3 and procedures like those described in Wente, Van A. "superfine Thermoplastic Fiber", Industrial and Engineering Chemistry, vol. 48. No. 8, 1956, pp 1342-1346 and Naval Research Laboratory Report 111437, Apr. 15, 1954, four monocomponent monolayer meltblown webs were formed from TOTAL™ 3960 350 melt flow rate polypropylene available from Total Petrochemicals to which had been added 1% tristearyl melamine as an electret charging additive. The polymer was fed to a Model 20 DAVIS STANDARD™ 2 in. (50.8 mm) single screw extruder from the Davis Standard Division of Crompton & Knowles Corp. The extruder had a 20/1 length/diameter ratio and a 3/1 compression ratio. A Zenith 10 cc/rev melt pump metered the flow of polymer to a 10 in. (25.4 cm) wide drilled orifice meltblowing die whose original 0.012 in. (0.3 mm) orifices had been modified by drilling out every 21st orifice to 0.025 in. (0.6 mm), thereby providing a 20:1 ratio of the number of smaller size to larger size holes and a 2:1 ratio of larger hole size to smaller hole size. The line of orifices had 25 holes/inch (10 holes/cm) hole spacing. Heated air attenuated the fibers at the die tip. The airknife employed a 0.010 in. (0.25 mm) positive set back and a 0.030 in. (0.76 mm) air gap. No to moderate vacuum was pulled through a medium mesh collector screen at the point of web formation. The polymer output rate from the extruder was varied from 1.0 to 4.0 lbs/in/hr (0.18 to 0.71 kg/cm/hr), the DCD (die-to-collector distance) was varied from 12.0 to 25.0 in. (30.5 to 63.5 cm) and the air pressure was adjusted as needed to provide webs with a basis weight and EFD as shown below in Table 1A. The webs were hydrocharged with distilled water according to the technique taught in U.S. Pat. No. 5,496,507 (Angadjivand et al. '507) and allowed to dry. Set out below in Table 1A are the Run Number, basis weight, EFD, web thickness, initial pressure drop, initial NaCl penetration and Quality Factor QF for each web at a 13.8 cm/sec face velocity.

TABLE 1A

| Run No. | Basis Wt., gsm | EFD, μm | Thickness, mm | Pressure Drop, mm $H_2O$ | Initial Penetration, % | Quality Factor, 1/mm $H_2O$ |
|---|---|---|---|---|---|---|
| 1-1F | 240 | 14.6 | 3.3 | 6.10 | 0.368 | 0.92 |
| 1-2F | 243 | 18 | 2.54 | 4.43 | 1.383 | 0.97 |
| 1-3F | 195 | 18.4 | 2.16 | 3.93 | 1.550 | 1.06 |
| 1-4F | 198 | 14.6 | 2.74 | 5.27 | 0.582 | 0.98 |

The Table 1A webs were next molded to form cup-shaped molded matrices for use as personal respirators. The top mold was heated to about 235° F. (113° C.), the bottom mold was heated to about 240° F. (116° C.), a mold gap of 0.050 in. (1.27 mm) was employed and the web was left in the mold for about 9 seconds. Upon removal from the mold, the matrix retained its molded shape. Set out below in Table 1B are the Run Number, King Stiffness, initial pressure drop, and the initial (and for Run Nos. 1-1M and 1-4M, the maximum loading) NaCl penetration values for the molded matrices.

TABLE 1B

| Run No. | King Stiffness, N | Pressure Drop, mm $H_2O$ | Initial Penetration, % | Maximum Loading Penetration, % |
|---|---|---|---|---|
| 1-1M | 1.87 | 7.37 | 0.269 | 2.35 |
| 1-2M | 2.89 | 4.97 | 0.541 | — |
| 1-3M | 2.00 | 3.93 | 0.817 | — |
| 1-4M | 1.60 | 5.77 | 0.348 | 3.95 |

Figure 6:
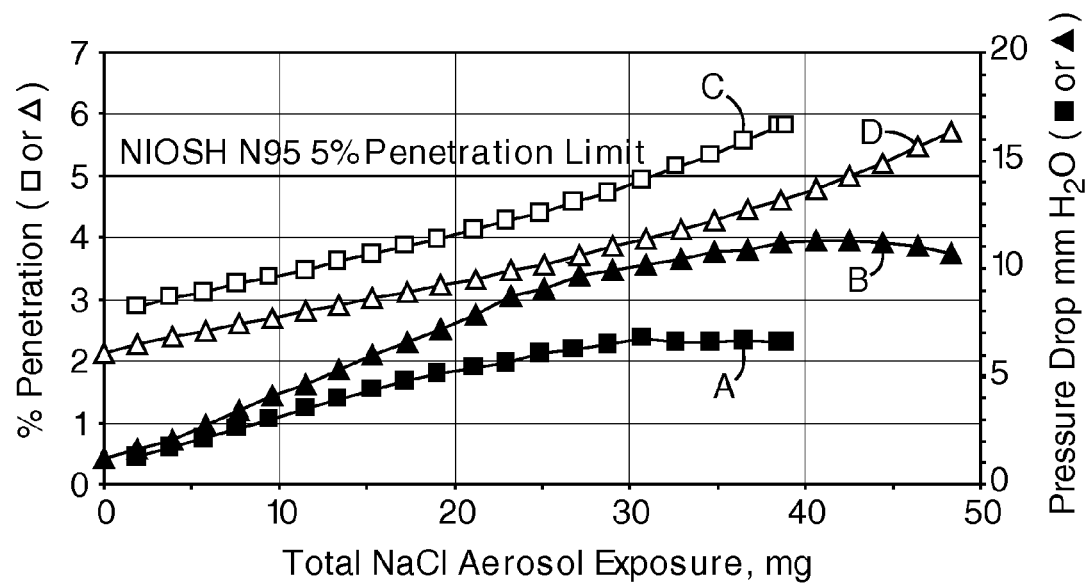
FIG. 6 is a graph showing % NaCl penetration and pressure drop for Run Nos. 1-1M and 2-2M of Example 1.

FIG. 6 is a graph showing % NaCl penetration and pressure drop for the molded matrices of Run Nos. 1-1M and 1-4M. Curves A and B respectively are the % NaCl penetration results for Run Nos. 1-1M and 1-4M, and Curves C and D respectively are the pressure drop results for Run Nos. 1-1M and 1-4M. FIG. 6 shows that the molded matrices of Run Nos. 1-1M and 1-4M provide monocomponent, monolayer molded matrices which pass the N95 NaCl loading test of 42 C.F.R. Part 84.

Example 2

Using the general method of Example 1, webs were made from 100% TOTAL 3960 polypropylene and then 1) corona charged or 2) corona and hydrocharged with distilled water. Set out below in Table 2A are the Run Number, charging technique, basis weight, EFD, web thickness, initial pressure drop, initial NaCl penetration and Quality Factor QF for each web.

TABLE 2A

| Run No. | Charging Technique | Basis Wt., gsm | EFD, μm | Thickness, mm | Pressure Drop, mm $H_2O$ | Initial Penetration, % | Quality Factor, 1/mm $H_2O$ |
|---|---|---|---|---|---|---|---|
| 2-1F | Corona | 237 | 14.2 | 3.23 | 6.70 | 32.4 | 0.17 |
| 2-2F | Corona/ Hydrocharged | 237 | 14.2 | 3.23 | 6.77 | 13.2 | 0.30 |
| 2-3F | Corona | 197 | 13.3 | 2.82 | 5.73 | 28.7 | 0.22 |
| 2-4F | Corona/ Hydrocharged | 197 | 13.3 | 2.82 | 5.93 | 6.3 | 0.47 |

The Table 2A webs were next molded using the method of Example 1 to form cup-shaped molded matrices for use as personal respirators. Set out below in Table 2B are the Run Number, King Stiffness, initial pressure drop, and initial NaCl penetration for the molded matrices.

TABLE 2B

| Run No. | King Stiffness, N | Pressure Drop, mm $H_2O$ | Initial Penetration, % |
|---|---|---|---|
| 2-1M | 1.82 | 8.37 | 16.867 |
| 2-2M | 1.82 | 10.27 | 7.143 |
| 2-3M | 1.65 | 6.47 | 16.833 |
| 2-4M | 1.65 | 7.47 | 5.637 |

The data in Table 2B show that these molded matrices had greater penetration than the Example 1 molded matrices but that they also had appreciable King Stiffness.

Example 3

Using the method of Example 1, webs were made from TOTAL 3960 polypropylene to which had been added 0.8% CHIMASSORB 944 hindered amine light stabilizer from Ciba Specialty Chemicals as an electret charging additive and then hydrocharged with distilled water. Set out below in Table 3A are the Run Number, basis weight, EFD, web thickness, initial pressure drop, initial NaCl penetration and Quality Factor QF for each web.

TABLE 3A

| Run No. | Basis Wt., gsm | EFD, μm | Thickness, mm | Pressure Drop, mm $H_2O$ | Initial Penetration, % | Quality Factor, 1/mm $H_2O$ |
|---|---|---|---|---|---|---|
| 3-1F | 246 | 17.9 | 2.95 | 4.27 | 0.811 | 1.13 |
| 3-2F | 203 | 18 | 2.41 | 3.37 | 2.090 | 1.15 |

The Table 3A webs were next molded using the method of Example 1 to form cup-shaped molded matrices for use as personal respirators. Set out below in Table 3B are the Run Number, King Stiffness, initial pressure drop, and initial NaCl penetration for the molded matrices.

TABLE 3B

| Run No. | King Stiffness, N | Pressure Drop, mm $H_2O$ | Initial Penetration, % |
|---|---|---|---|
| 3-1M | 2.89 | 5.30 | 0.591 |
| 3-2M | 1.96 | 3.90 | 1.064 |

The data in Table 3B show that these molded matrices had greater penetration than the Example 1 molded matrices but that they also had appreciable King Stiffness.

Example 4

Using the method of Example 2, webs were made from TOTAL 3868 37 melt flow rate polypropylene available from Total Petrochemicals and then 1) corona charged or 2) corona and hydrocharged with distilled water. Set out below in Table 4A are the Run Number, charging technique, basis weight, EFD, web thickness, initial pressure drop, initial NaCl penetration and Quality Factor QF for each web.

TABLE 4A

| Run No. | Charging Technique | Basis Wt., gsm | EFD, μm | Thickness, mm | Pressure Drop, mm $H_2O$ | Initial Penetration, % | Quality Factor, 1/mm $H_2O$ |
|---|---|---|---|---|---|---|---|
| 4-1F | Corona | 239 | 18.2 | 3.15 | 3.67 | 35.233 | 0.29 |
| 4-2F | Corona/Hydrocharged | 239 | 18.2 | 3.15 | 3.60 | 7.183 | 0.73 |

TABLE 4A-continued

| Run No. | Charging Technique | Basis Wt., gsm | EFD, μm | Thickness, mm | Pressure Drop, mm H$_2$O | Initial Penetration, % | Quality Factor, 1/mm H$_2$O |
|---|---|---|---|---|---|---|---|
| 4-3F | Corona | 204 | 18 | 2.69 | 3.53 | 27.300 | 0.37 |
| 4-4F | Corona/ Hydrocharged | 204 | 18 | 2.69 | 3.60 | 8.923 | 0.67 |

The Table 4A webs were next molded using the method of Example 1 to form cup-shaped molded matrices for use as personal respirators. Set out below in Table 4B are the Run Number, King Stiffness, initial pressure drop, and initial NaCl penetration for the molded matrices.

TABLE 4B

| Run No. | King Stiffness, N | Pressure Drop, mm H$_2$O | Initial Penetration, % |
|---|---|---|---|
| 4-1M | 3.20 | 3.27 | 21.867 |
| 4-2M | 3.20 | 3.77 | 7.443 |
| 4-3M | 1.42 | 4.17 | 17.967 |
| 4-4M | 1.42 | 5.63 | 6.100 |

The data in Table 4 show that these molded matrices had greater penetration than the Example 1 molded matrices but that they also had appreciable stiffness.

Example 5

Using the method of Example 3, webs were made from TOTAL 3868 polypropylene to which had been added 0.8% CHIMASSORB 944 hindered amine light stabilizer from Ciba Specialty Chemicals as an electret charging additive and then hydrocharged with distilled water. Set out below in Table 5A are the Run Number, basis weight, EFD, web thickness, initial pressure drop, initial NaCl penetration and Quality Factor QF for each web.

TABLE 5A

| Run No. | Basis Wt., gsm | EFD, μm | Thickness, mm | Pressure Drop, mm H$_2$O | Initial Penetration, % | Quality Factor, 1/mm H$_2$O |
|---|---|---|---|---|---|---|
| 5-1F | 243 | 22.2 | 2.67 | 3.13 | 4.040 | 1.02 |
| 5-2F | 196 | 18.9 | 2.46 | 2.73 | 4.987 | 1.10 |

The Table 5A webs were next molded using the method of Example 1 to form cup-shaped molded matrices for use as personal respirators. Set out below in Table 5B are the Run Number, King Stiffness, initial pressure drop, and initial NaCl penetration for the molded matrices.

TABLE 5B

| Run No. | King Stiffness, N | Pressure Drop, mm H$_2$O | Initial Penetration, % |
|---|---|---|---|
| 5-1M | 2.14 | 4.87 | 0.924 |
| 5-2M | 1.78 | 3.43 | 1.880 |

The data in Table 5B show that these molded matrices had greater penetration than the Example 1 molded matrices but that they also had appreciable King Stiffness.

Example 6

Using the method of Example 2, webs were made from EXXON™ PP3746G 1475 melt flow rate polypropylene available from Exxon Mobil Corporation and then 1) corona charged or 2) corona and hydrocharged with distilled water. Set out below in Table 6A are the Run Number, charging technique, basis weight, EFD, web thickness, initial pressure drop, initial NaCl penetration and Quality Factor QF for each web.

TABLE 6A

| Run No. | Charging Technique | Basis Wt., gsm | EFD, μm | Thickness, mm | Pressure Drop, mm H$_2$O | Initial Penetration, % | Quality Factor, 1/mm H$_2$O |
|---|---|---|---|---|---|---|---|
| 6-1F | Corona | 247 | 14.7 | 4.22 | 10.63 | 17.533 | 0.16 |
| 6-2F | Corona/ Hydrocharged | 247 | 14.7 | 4.22 | 14.6 | 7.55 | 0.18 |
| 6-3F | Corona | 241 | 17.9 | 3.02 | 6.3 | 23.533 | 0.24 |
| 6-4F | Corona/ Hydrocharged | 241 | 17.9 | 3.02 | 7.53 | 6.52 | 0.36 |
| 6-5F | Corona | 200 | 14 | 3.10 | 7.87 | 12.667 | 0.26 |
| 6-6F | Corona/ Hydrocharged | 200 | 14 | 3.10 | 10.43 | 7.06 | 0.25 |
| 6-7F | Corona | 203 | 18.3 | 2.45 | 4.27 | 17.333 | 0.41 |
| 6-8F | Corona/ Hydrocharged | 203 | 18.3 | 2.45 | 5.2 | 6.347 | 0.53 |

The Table 6A webs were next molded using the method of Example 1 to form cup-shaped molded matrices for use as personal respirators. Set out below in Table 6B are the Run Number, King Stiffness, initial pressure drop, and initial NaCl penetration for the molded matrices.

TABLE 6B

| Run No. | King Stiffness, N | Pressure Drop, mm H$_2$O | Initial Penetration, % |
|---|---|---|---|
| 6-1M | 2.05 | 10.63 | 17.533 |
| 6-2M | 2.05 | 14.60 | 7.550 |
| 6-3M | 2.85 | 6.30 | 23.533 |
| 6-4M | 2.85 | 7.53 | 6.520 |
| 6-5M | 1.51 | 7.87 | 12.667 |
| 6-6M | 1.51 | 10.43 | 7.060 |
| 6-7M | 2.05 | 4.27 | 17.333 |
| 6-8M | 2.05 | 5.20 | 6.347 |

Figure 7:
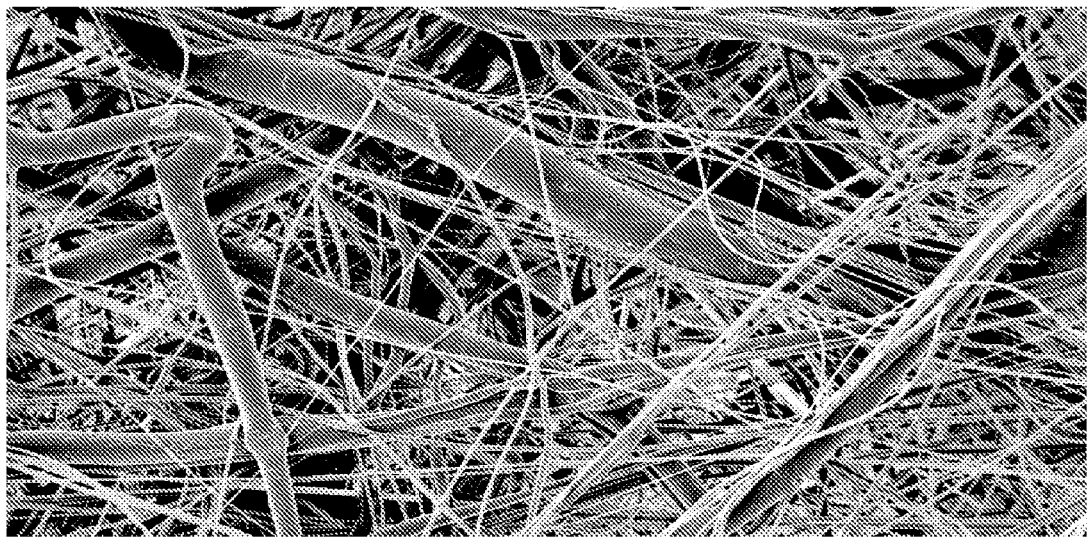
FIG. 7 and FIG. 8 are photomicrographs of the Run No. 6-8F flat web and the Run No. 6-8M molded matrix of Example 6.
Figure 8:
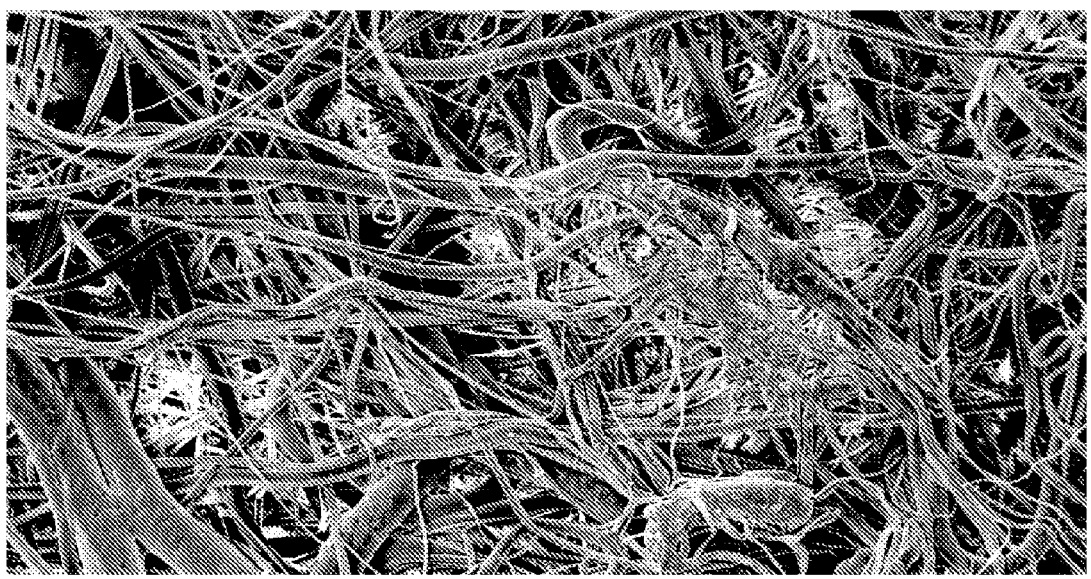
Figure 9:
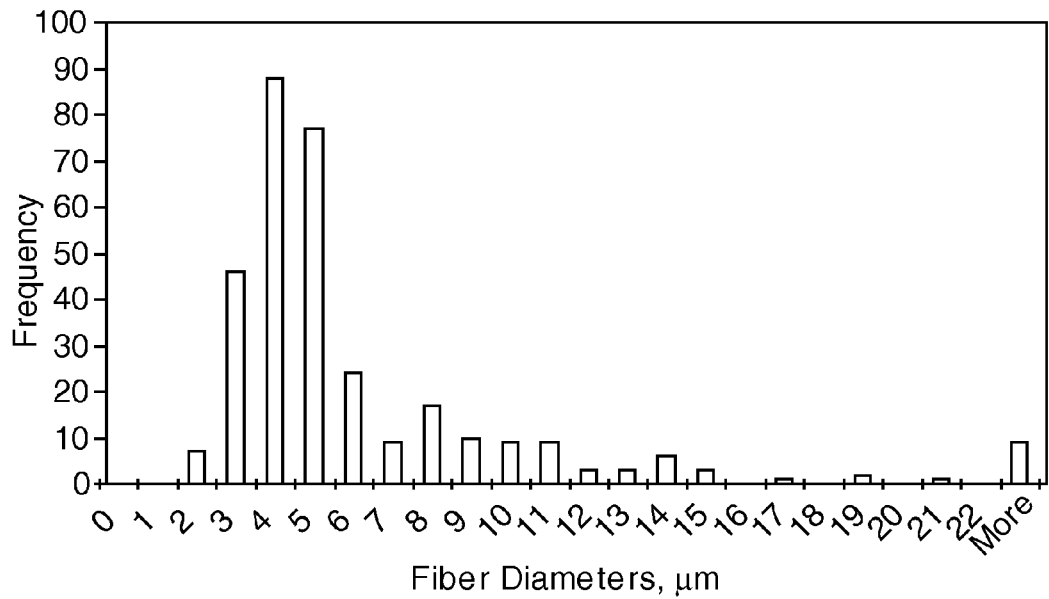
FIG. 9 and FIG. 10 are histograms of fiber count (frequency) vs. fiber size in μm for the Run No. 6-8F flat web and the Run No. 6-8M molded matrix of Example 6.
Figure 10:
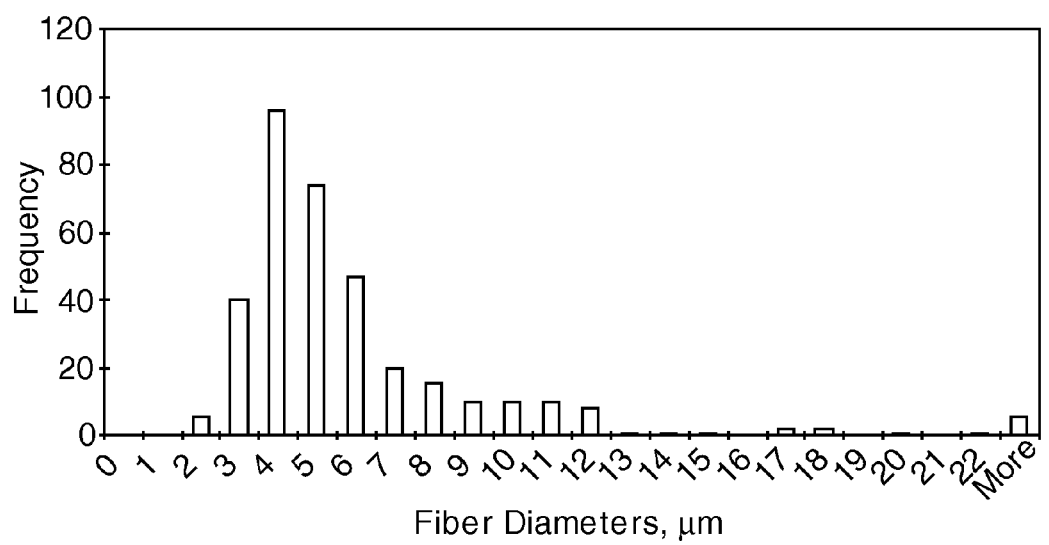

The Run No. 6-8F flat web and 6-8M molded matrix were analyzed using scanning electron microscopy (SEM), at magnifications of 50 to 1,000× made using a LEO VP 1450 electron microscope (from the Carl Zeiss Electron Microscopy Group), operated at 15 kV, 15 mm WD, 0° tilt, and using a gold/palladium-coated sample under high vacuum. FIG. 7 and FIG. 8 are photomicrographs of the Run No. 6-8F flat web and the Run No. 6-8M molded matrix. Histograms of fiber count (frequency) vs. fiber size in μm were obtained from SEM images at magnifications of 350 to 1,000× taken from each side of the flat web or matrix. About 150-200 fibers from the SEM image for each side were counted and measured using the UTHSCSA IMAGE TOOL image analysis program from the University of Texas Health Science Center at San Antonio, and then the observations for the two sides were combined. FIG. 9 and FIG. 10 are histograms of fiber count (frequency) vs. fiber size for the Run No. 6-8F flat web and the Run No. 6-8M molded matrix of Example 6. Further details regarding the fiber size analyses for these webs are shown below in Table 6C:

TABLE 6C

|  | (Values in μm): | |
|---|---|---|
|  | 6-8F Flat Web | 6-8M Molded Matrix |
| Mean | 5.93 | 5.67 |
| Std. Dev. | 5.36 | 4.30 |
| Min. | 1.39 | 1.35 |
| Max. | 42.62 | 36.83 |
| Median | 4.24 | 4.44 |
| Mode | 4.06 | 3.94 |
| Fiber Count | 324 | 352 |

Example 7

Using the method of Example 1, webs were made from EXXON PP3746G polypropylene to which had been added 1% tristearyl melamine as an electret charging additive and then hydrocharged with distilled water. Set out below in Table 7A are the Run Number, basis weight, EFD, web thickness, initial pressure drop, initial NaCl penetration and Quality Factor QF for each web.

TABLE 7A

| Run No. | Basis Wt., gsm | EFD, μm | Thickness, mm | Pressure Drop, mm H$_2$O | Initial Penetration, % | Quality Factor, 1/mm H$_2$O |
|---|---|---|---|---|---|---|
| 7-1F | 247 | 14.2 | 3.63 | 6.20 | 0.537 | 0.84 |
| 7-2F | 204 | 14.3 | 3.05 | 5.77 | 0.596 | 0.89 |

The Table 7A webs were next molded using the method of Example 1 to form cup-shaped molded matrices for use as personal respirators. Set out below in Table 7B are the Run Number, King Stiffness, initial pressure drop, and initial NaCl penetration for the molded matrices.

TABLE 7B

| Run No. | King Stiffness, N | Pressure Drop, mm H$_2$O | Initial Penetration, % | Maximum Loading Penetration, % |
|---|---|---|---|---|
| 7-1M | 1.91 | 12.07 | 0.282 | 2.39 |
| 7-2M | 1.33 | 9.17 | 0.424 | 5.14 |

Figure 11:
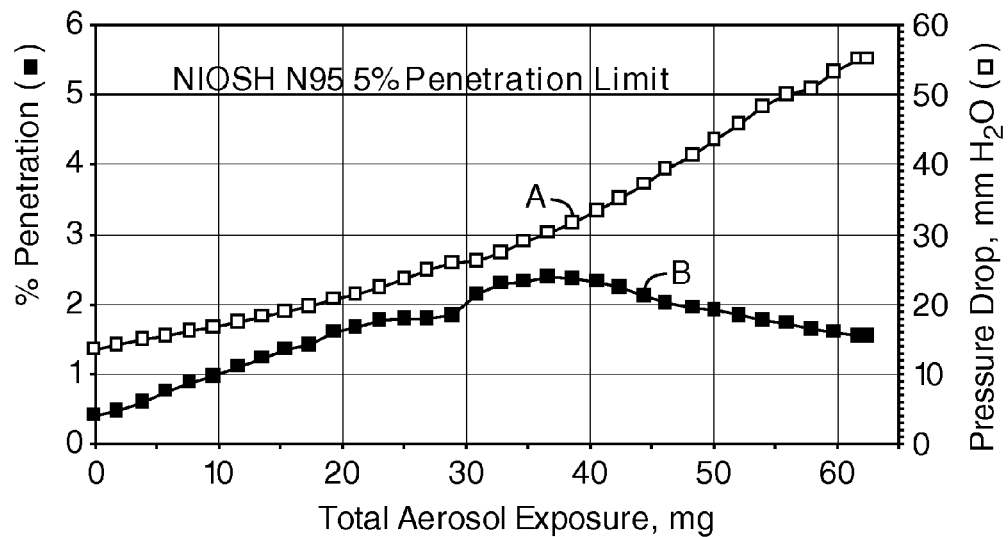
FIG. 11 is a graph showing % NaCl penetration and pressure drop for Run No. 7-1M of Example 7.

FIG. 11 is a graph showing % NaCl penetration and pressure drop for the molded matrix of Run No. 7-1M. Curves A and B respectively are the % NaCl penetration and pressure drop results. FIG. 11 and the data in Table 7B show that the molded matrix of Run No. 7-1M provides a monocomponent, monolayer molded matrix which passes the N95 NaCl loading test of 42 C.F.R. Part 84.

Example 8

Using the method of Example 3, webs were made from EXXON PP3746G polypropylene to which had been added 0.8% CHIMASSORB 944 hindered amine light stabilizer from Ciba Specialty Chemicals as an electret charging additive and then hydrocharged with distilled water. Set out below in Table 8A are the Run Number, basis weight, EFD, web thickness, initial pressure drop, initial NaCl penetration and Quality Factor QF for each web.

TABLE 8A

| Run No. | Basis Wt., gsm | EFD, μm | Thickness, mm | Pressure Drop, mm H$_2$O | Initial Penetration, % | Quality Factor, 1/mm H$_2$O |
|---|---|---|---|---|---|---|
| 8-1F | 244 | 14.4 | 3.86 | 6.50 | 0.129 | 1.02 |
| 8-2F | 239 | 18.5 | 3.02 | 4.20 | 0.883 | 1.13 |
| 8-3F | 204 | 14.6 | 3.10 | 5.67 | 0.208 | 1.09 |
| 8-4F | 201 | 18.7 | 2.46 | 3.43 | 1.427 | 1.24 |

The Table 8A webs were next molded using the method of Example 1 to form cup-shaped molded matrices for use as personal respirators. Set out below in Table 8B are the Run Number, King Stiffness, initial pressure drop, and the initial (and, for Run No. 8-3M, the maximum loading) NaCl penetration values for the molded matrices.

TABLE 8B

| Run No. | King Stiffness, N | Pressure Drop, mm H$_2$O | Initial Penetration, % | Maximum Loading Penetration, % |
|---|---|---|---|---|
| 8-1M | 2.49 | 12.07 | 0.057 | |
| 8-2M | 2.89 | 6.87 | 0.485 | |

TABLE 8B-continued

| Run No. | King Stiffness, N | Pressure Drop, mm H$_2$O | Initial Penetration, % | Maximum Loading Penetration, % |
|---|---|---|---|---|
| 8-3M | 1.65 | 8.83 | 0.153 | 4.89 |
| 8-4M | 1.87 | 4.73 | 0.847 | |

The data in Table 8B show that at least the molded matrix of Run No. 8-3M provides a monocomponent, monolayer molded matrix which passes the N95 NaCl loading test of 42 C.F.R. Part 84. The Run No. 8-1M, 8-2M and 8-4M molded matrices were not tested to determine their maximum loading penetration.

Example 9

Using the method of Example 2, webs were made from EXXON PP3746G polypropylene to which had been added 1% tristearyl melamine as an electret charging additive and then hydrocharged with distilled water. The resulting flat webs were formed into molded respirators whose other layers were like those in U.S. Pat. No. 6,041,782 (Angadjivand et al. '782) and U.S. Pat. No. 6,923,182 B2 (Angadjivand et al. '183). The respirators included a blown microfiber outer cover layer web, a PE85-12 thermoplastic nonwoven adhesive web from Bostik Findley, the flat web of this Example 9, another PE85-12 thermoplastic nonwoven adhesive web and another blown microfiber inner cover layer web. The layers were formed into a cup-shaped respirator using a mold like that described above but having a ribbed front surface. The resulting molded respirators were evaluated according to ASTM F-1862-05, "Standard Test Method for Resistance of Medical Face Masks to Penetration by Synthetic Blood (Horizontal Projection of Fixed Volume at a Known Velocity)", at test pressures of 120 mm Hg and 160 mm Hg. The 120 mm Hg test employed a 0.640 sec. valve time and a 0.043 MPa tank pressure. The 160 mm Hg test employed a 0.554 sec. valve time and a 0.052 MPa tank pressure. The respirators passed the test at both test pressures. Set out below in Table 9 are the Run Number, and the basis weight, EFD, thickness, initial pressure drop and initial NaCl penetration for the molded monocomponent web.

TABLE 9

| Run No. | Basis Wt., gsm | EFD, µm | Flat Web Thickness, mm | Pressure Drop, mm H$_2$O after molding | Initial Penetration, % |
|---|---|---|---|---|---|
| 9-1M | 199 | 11.9 | 3.22 | 8.7 | 0.269 |
| 9-2M | 148 | 12.2 | 2.4 | 9.6 | 0.75 |

Example 10

Using the method of Comparative Example 3 of U.S. Pat. No. 6,319,865 B1 (Mikami), webs were prepared using a 10 in. (25.4 cm) wide drilled orifice die whose tip had been modified to provide a row of larger and smaller sized orifices. The larger orifices had a 0.6 mm diameter (Da), the smaller orifices had a 0.4 mm diameter (Db), the orifice diameter ratio R (Da/Db) was 1.5, there were 5 smaller orifices between each pair of larger orifices and the orifices were spaced at 30 orifices/in. (11.8 orifices/cm). A single screw extruder with a 50 mm diameter screw and a 10 cc melt pump were used to supply the die with 100% TOTAL 3868 polypropylene. The die also had a 0.20 mm air slit width, a 60° nozzle edge angle, and a 0.58 mm air lip opening. A fine mesh screen moving at 1 to 50 m/min was employed to collect the fibers. The other operating parameters are shown below in Table 10A:

TABLE 10A

| Parameter | Value |
|---|---|
| Polymer melt flow rate | 37 MFR |
| Extruder barrel temp | 320° C. |
| Screw speed | 8 rpm |
| Polymer flow rate | 4.55 kg/hr |
| Die temp | 300° C. |
| DCD | 200 mm |
| Die Air temp | 275° C. |
| Die Air rate | 5 Nm$^3$/min |
| Larger Orifice diameter Da | 0.6 mm |
| Smaller Orifice diameter Db | 0.4 mm |
| Orifice Diameter ratio R (Da/Db) | 1.5 |
| Number of smaller orifices per larger orifice | 5 |
| Average Fiber Diameter, µm | 2.44 |
| St Dev Fiber Diameter, µm | 1.59 |
| Min Fiber Diameter, µm | 0.65 |
| Max Fiber Diameter, µm | 10.16 |
| EFD, µm | 9.4 |
| Shot | Many |

Using the above-mentioned operating parameters, a shot-free web was not obtained. Had shot-free web been formed, the observed Effective Fiber Diameter value would likely have been less than the 9.4 µm value reported above. Shot-containing webs were nonetheless prepared at four different basis weights, namely; 60, 100, 150 and 200 gsm, by varying the collector speed.

Figure 12:
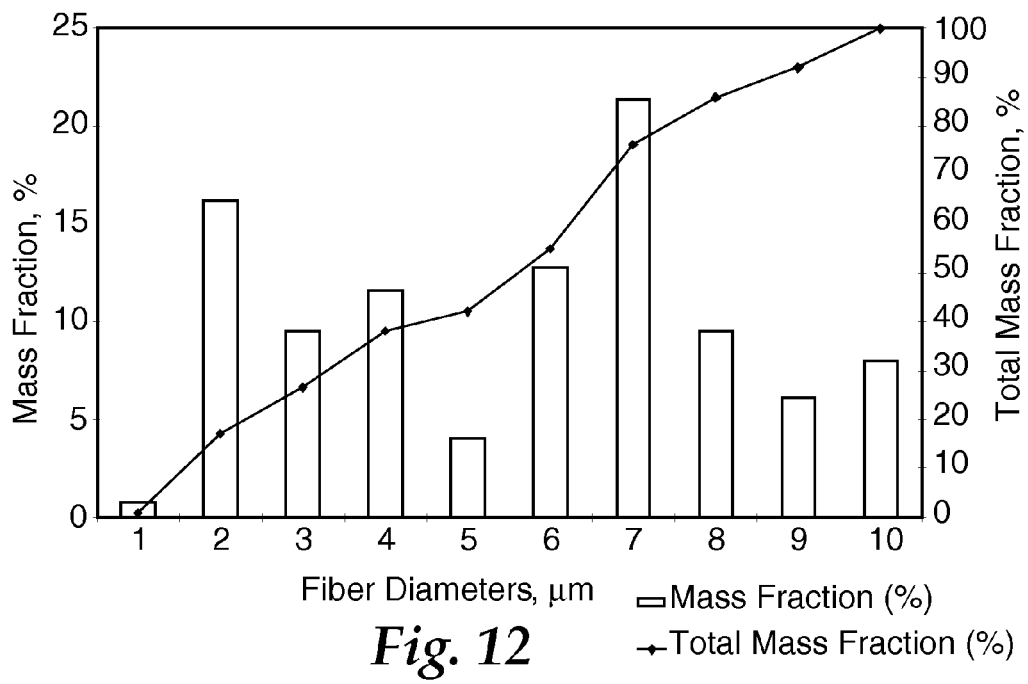
FIG. 12, FIG. 13 and FIG. 15 are histograms of mass fraction vs. fiber size in μm.

FIG. 12 is a histogram of mass fraction vs. fiber size in µm for the 200 gsm web. The web exhibited modes at 2 and 7 µm. Local peaks also appeared at 4 and 10 µm. The 4 µm peak did not have a larger height than fiber sizes 2 µm smaller and 2 µm larger and did not represent a mode, and the 10 µm peak did not have a larger height than fiber sizes 2 µm smaller and did not represent a mode. As shown in FIG. 12, the web did not have a larger size fiber mode greater than 10 µm.

The 200 gsm web was molded using the general method of Example 2 to form a cup-shaped molded matrix. The heated mold was closed to a 0.5 mm gap and an approximate 6 second dwell time was employed. The molded matrix was allowed to cool, and found to have a King Stiffness value of 0.64 N.

It was determined that shot could be reduced by employing a higher melt flow index polymer and increasing the DCD value. Using 100% TOTAL 3860X 100 melt flow rate polypropylene available from Total Petrochemicals and the operating parameters shown below in Table 10B, webs with substantially reduced shot were formed at 60, 100, 150 and 200 gsm by varying the collector speed. The resulting webs had considerably more fibers with a diameter greater than 10 µm than was the case for the webs produced using the Table 10A operating parameters.

TABLE 10B

| Parameter | Value |
|---|---|
| Polymer melt flow rate | 100 MFR |
| Extruder barrel temp | 320° C. |
| Screw speed | 8 rpm |
| Polymer flow rate | 4.55 kg/hr |
| Die temp | 290° C. |
| DCD | 305 mm |
| Die Air temp | 270° C. |
| Die Air rate | 4.4 Nm$^3$/min |

TABLE 10B-continued

| Parameter | Value |
|---|---|
| Larger Orifice diameter Da | 0.6 mm |
| Smaller Orifice diameter Db | 0.4 mm |
| Orifice Diameter ratio R (Da/Db) | 1.5 |
| Number of smaller orifices per larger orifice | 5 |
| Average Fiber Diameter, μm | 3.82 |
| St Dev Fiber Diameter, μm | 2.57 |
| Min Fiber Diameter, μm | 1.33 |
| Max Fiber Diameter, μm | 20.32 |
| EFD, μm | 13.0 |
| Shot | Not Many |

Figure 13:
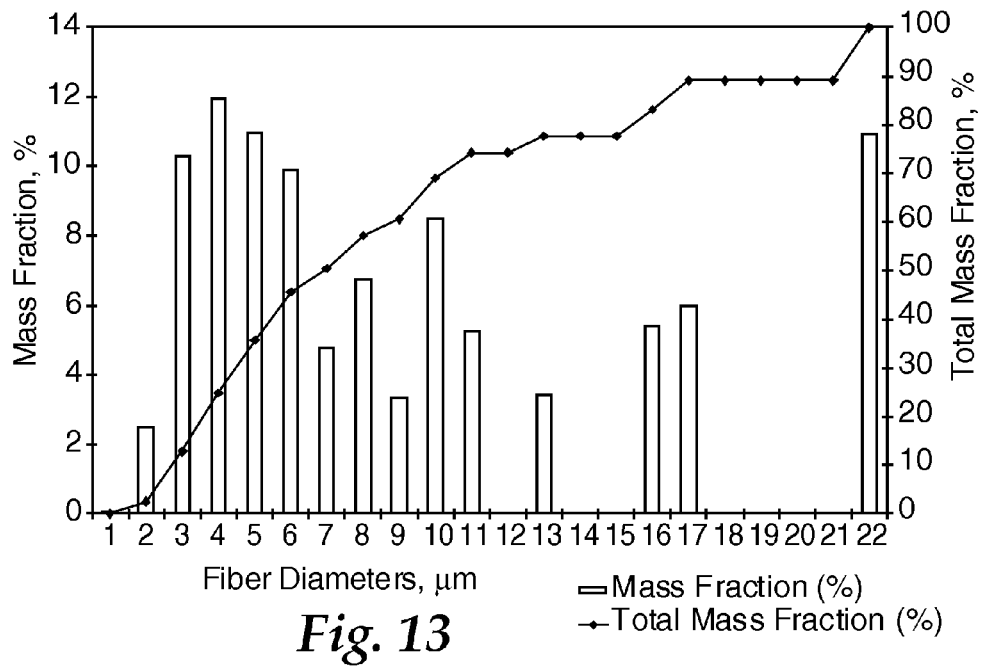
Figure 14:
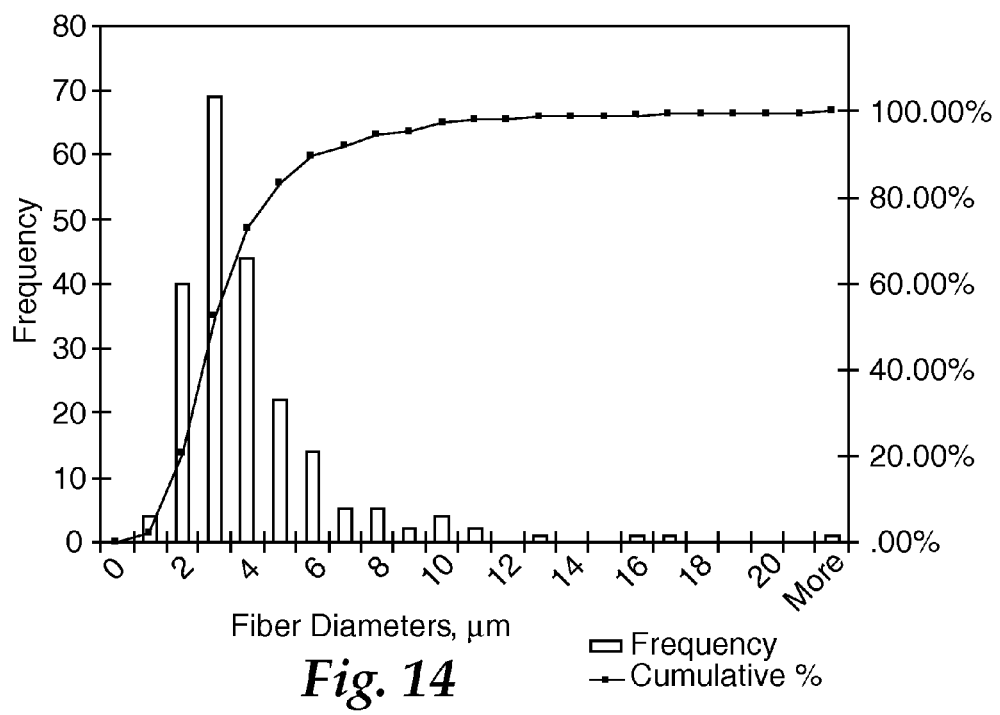
FIG. 14 and FIG. 16 are histograms of fiber count (frequency) vs. fiber size in μm, for a series of webs of Example 10.

FIG. 13 is a histogram of mass fraction vs. fiber size in μm for the 200 gsm web. The web exhibited modes at 4, 10, 17 and 22 μm. Local, non-modal peaks also appeared at 8 and 13 μm. As shown in FIG. 13, the web had larger size fiber modes greater than 10 μm. FIG. 14 is a histogram of fiber count (frequency) vs. fiber size in μm for the same 200 gsm web.

The 200 gsm web was molded using the general method of Example 2 to form a cup-shaped molded matrix. The heated mold was closed to a 0.5 mm gap and an approximate 6 second dwell time was employed. The molded matrix was allowed to cool, and found to have a King Stiffness value of 0.98 N, a value that was not greater than 1 N.

It was also determined that shot could be reduced by employing a die with a greater number of smaller orifices per larger orifice than the Mikami et al. dies. Webs with minimal shot were also produced at 60, 100, 150 and 200 gsm using both TOTAL 3868 and TOTAL 3860X polymers and a different 10 in. (25.4 cm) wide drilled orifice die. The die tip for this latter die had been modified to provide a row of larger and smaller sized orifices with a greater number of smaller orifices between larger orifices than disclosed in Mikami et al. The larger orifices had a 0.63 mm diameter (Da), the smaller orifices had a 0.3 mm diameter (Db), the orifice diameter ratio R (Da/Db) was 2.1, there were 9 smaller orifices between each pair of larger orifices and the orifices were spaced at 25 orifices/in. (9.8 orifices/cm). A single screw extruder with a 50 mm diameter screw and a 10 cc melt pump were used to supply the die with polymer. The die also had a 0.76 mm air slit width, a 60° nozzle edge angle, and a 0.86 mm air lip opening. A fine mesh screen moving at 1 to 50 m/min and the operating parameters shown below in Table 10C were employed to collect webs at 60, 100, 150 and 200 gsm:

TABLE 10C

| Parameter | Value | |
|---|---|---|
| Polymer melt flow rate | 37 MFR | 100 MFR |
| Extruder barrel temp | 320° C. | 320° C. |
| Screw speed | 9 rpm | 10 rpm |
| Polymer flow rate | 4.8 kg/hr | 4.8 kg/hr |
| Die temp | 295° C. | 290° C. |
| DCD | 395 mm | 420 mm |
| Die Air temp | 278° C. | 274° C. |
| Die Air rate | 4.8 Nm³/min | 4.8 Nm³/min |
| Larger Orifice diameter Da | 0.63 mm | 0.63 mm |
| Smaller Orifice diameter Db | 0.3 mm | 0.3 mm |
| Orifice Diameter ratio R (Da/Db) | 2.1 | 2.1 |
| Number of smaller orifices per larger orifice | 9 | 9 |
| Average Fiber Diameter, μm | 2.31 | 2.11 |
| St Dev Fiber Diameter, μm | 4.05 | 3.12 |
| Min Fiber Diameter, μm | 0.17 | 0.25 |
| Max Fiber Diameter, μm | 23.28 | 23.99 |
| EFD, μm | 10.4 | 11.2 |
| Shot | Not Many | Not Many |

Figure 15:
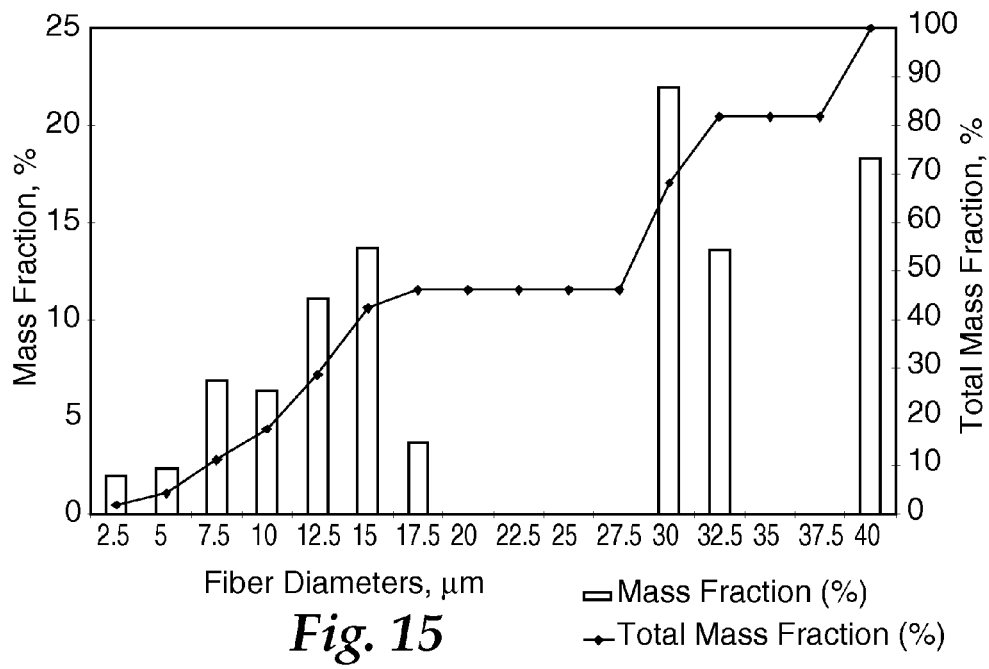
Figure 16:
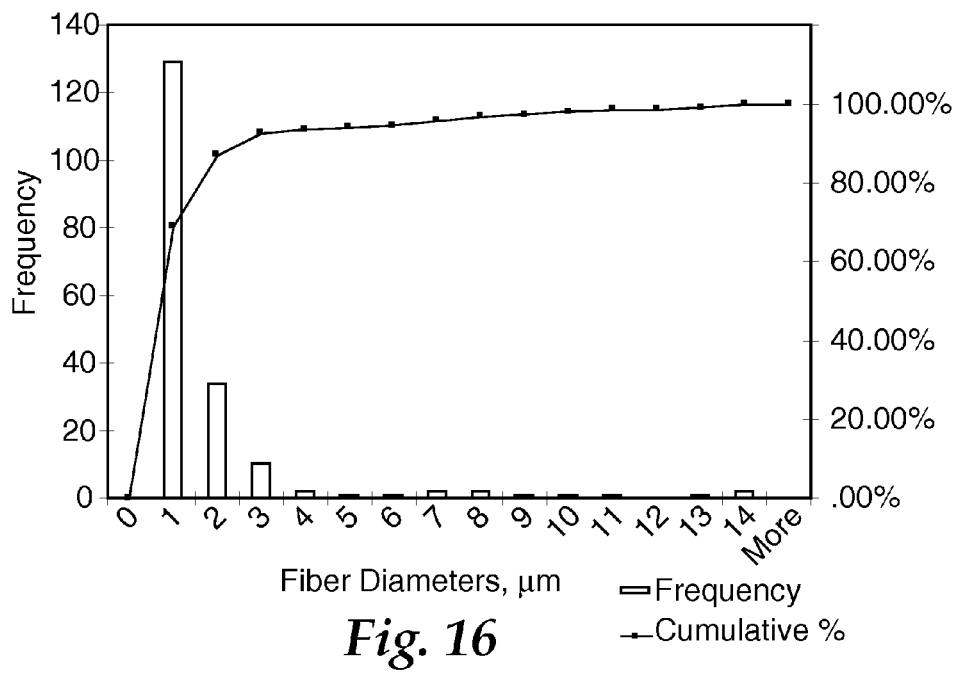

FIG. 15 is a histogram of mass fraction vs. fiber size in μm for the 200 gsm 100 MFR web. The web exhibited modes at 15, 30 and 40 μm. As shown in FIG. 15, the web had a larger size fiber mode greater than 10 μm. FIG. 16 is a histogram of fiber count (frequency) vs. fiber size in μm for the same 200 gsm web.

The webs from Table 10A, Table 10B and Table 10C were molded using the general method of Example 1 to form cup-shaped molded matrices. The heated mold was closed to a zero gap for webs with basis weights of 60 and 100 gsm, and closed to a 0.5 mm gap for webs with basis weights of 150 and 200 gsm. An approximate 6 second dwell time was employed. The 200 gsm molded matrices were evaluated to determine King Stiffness, and found to have respective King Stiffness values of 1.2 N (37 MFR polymer) and 1.6 N (100 MFR polymer). The 60, 100 and 150 gsm webs were below the threshold of measurement and thus were not evaluated to determine King Stiffness.

The molded matrices from all webs were also evaluated to determine their Deformation Resistance DR. The results are shown below in Table 10D:

TABLE 10D

| Web made according to operating parameters of: | Polymer Melt Flow Rate | Basis Weight, gsm | | | |
|---|---|---|---|---|---|
| | | 60 | 100 | 150 | 200 |
| | | Deformation Resistance DR, g | | | |
| Table 10A | 37 | 7.35 | 23.56 | 46.37 | 75.81 |
| Table 10B | 100 | 7.35 | 23.59 | 71.78 | 108.01 |
| Table 10C | 37 | 20.16 | 46.21 | 92.58 | 134.67 |
| Table 10C | 100 | 12.8 | 34.58 | 121.01 | 187.56 |

Figure 17:
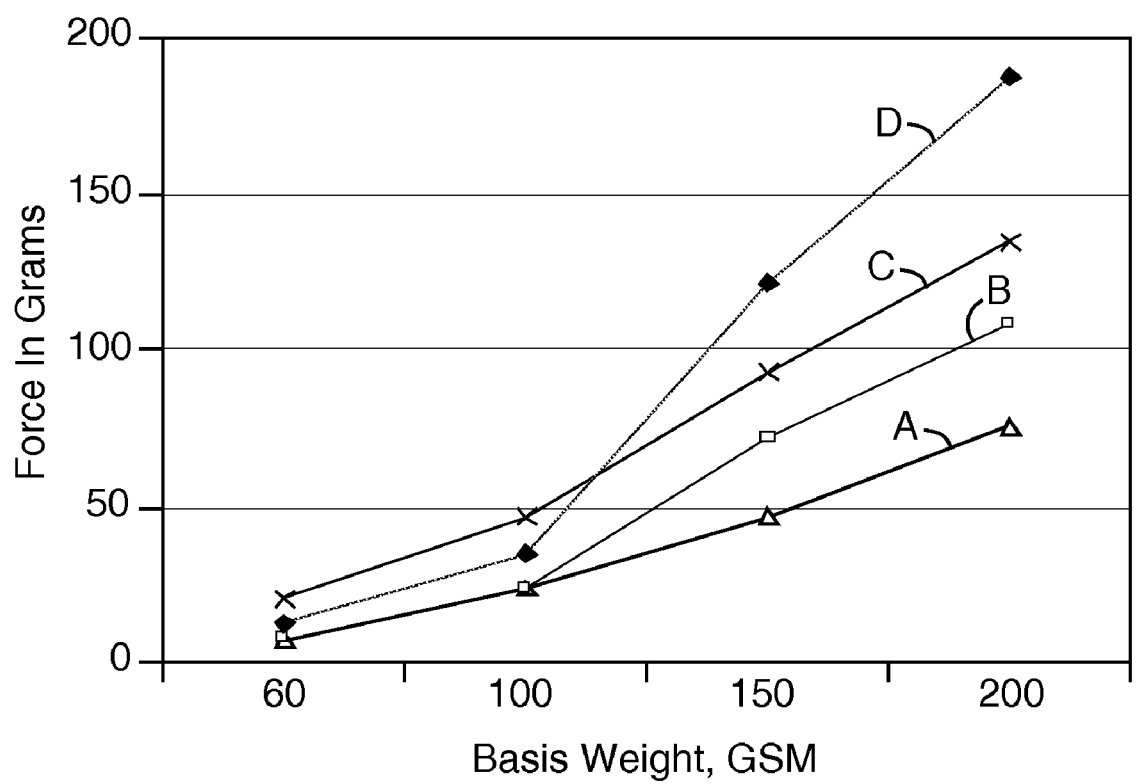
FIG. 17 is a graph showing Deformation Resistance DR for a series of molded matrices of Example 10.

FIG. 17 shows a plot of Deformation Resistance DR values vs. basis weight. Curves A, B, C and D respectively show webs made according to Table 10A (37 gsm, 5:1 Db/Da ratio), Table 10B and Table 10C (37 gsm) and Table 10C (100 gsm). As shown in Table 10D and FIG. 17, webs made according to Mikami et al. Comparative Example 5 using a polymer like the 40 melt flow rate polymer employed by Mikami et al. had relatively low Deformation Resistance DR values. Employing a higher melt flow rate polymer than the Mikami et al. polymer or using a die with a greater number of smaller orifices per larger orifice than the Mikami et al. dies provided webs having significantly greater Deformation Resistance DR values.

A number of embodiments of the invention have been described. Nevertheless, it will be understood that various modifications may be made without departing from the invention. Accordingly, other embodiments are within the scope of the following claims.

We claim:

1. A porous monocomponent self-supporting nonwoven web comprising a monolayer matrix containing a bimodal fiber count/fiber size mixture of intermingled meltblown attenuated microfibers and meltblown attenuated monocomponent larger size fibers of the same polymeric composition, wherein there are at least five times as many microfibers as larger size fibers, wherein a histogram of the mass fraction of fibers vs. fiber size exhibits a larger size fiber mode of from about 10 μm, to 50 μm, wherein the larger size fibers have a maximum diameter of about 50 μm, and wherein the monolayer matrix comprises a generally uniform distribution of fiber sizes throughout a cross-section of the web.

2. A nonwoven web according to claim 1 wherein there are at least 6 times as many microfibers as larger size fibers.

3. A nonwoven web according to claim 1 wherein there are at least 10 times as many microfibers as larger size fibers.

4. A nonwoven web according to claim 1 wherein the histogram of mass fraction vs. fiber size in μm exhibits a microfiber mode of about 1 to about 5 μm and a larger size fiber mode of about 12 to about 30 μm.

5. A nonwoven web according to claim 1 wherein a histogram of fiber count (frequency) vs. fiber size in μm exhibits at least two modes whose corresponding fiber sizes differ by at least 50% of the smaller fiber size.

6. A nonwoven web according to claim 1 wherein a histogram of fiber count (frequency) vs. fiber size in μm exhibits at least two modes whose corresponding fiber sizes differ by at least 100% of the smaller fiber size.

7. A nonwoven web according to claim 1 having a basis weight of about 80 to about 250 gsm.

8. A nonwoven web according to claim 1 which exhibits less than 5% maximum penetration when exposed to a 0.075 μm sodium chloride aerosol flowing at a 13.8 cm/sec face velocity.

9. A nonwoven web according to claim 1 wherein the polymer is polypropylene.

10. The porous monocomponent nonwoven web of claim 1 wherein the intermingled microfibers and larger size fibers comprise continuous fibers.

11. The porous monocomponent web of claim 10 wherein the intermingled continuous microfibers and larger size fibers comprise a ratio of length to size of at least about 10,000.

12. The porous monocomponent web of claim 1 wherein the web is charged.

13. The porous monocomponent web of claim 1 wherein a histogram of the mass fraction of fibers vs. fiber size exhibits a larger size fiber mode of about 10 to about 40 μm.

14. The porous monocomponent web of claim 1 wherein the larger size fibers have a size range of from about 10 μm, to 50 μm.

* * * * *

UNITED STATES PATENT AND TRADEMARK OFFICE
CERTIFICATE OF CORRECTION

PATENT NO.        : 7,902,096 B2                                             Page 1 of 1
APPLICATION NO.   : 11/461136
DATED             : March 8, 2011
INVENTOR(S)       : Brandner et al.

It is certified that error appears in the above-identified patent and that said Letters Patent is hereby corrected as shown below:

Column 7
Line 26, delete "307 (now issued as" and insert -- 307 (Attorney Docket No. 62284US002; now issued as --, therefor.

Column 7
Line 29, delete "11/461,145 (now allowed)," and insert -- 11/461,145 (Attorney Docket No. 62288US002; now allowed), --, therefor.

Signed and Sealed this
Twenty-second Day of November, 2011

David J. Kappos
*Director of the United States Patent and Trademark Office*